(12) United States Patent
Myrant et al.

(10) Patent No.: US 8,596,671 B2
(45) Date of Patent: Dec. 3, 2013

(54) MULTI-FUNCTIONAL COLLAPSIBLE WHEELED APPARATUS

(75) Inventors: Paul R. Myrant, Lakewood, CO (US);
Phillip C. Aumiller, Lyons, CO (US);
Grady E. Barfoot, Denver, CO (US);
Jonathan C. Fragoso, Louisville, CO (US); Michael C. Messaros, Erie, CO (US)

(73) Assignee: Cartable, Inc., Denver, CO (US)

( * ) Notice: Subject to any disclaimer, the term of this patent is extended or adjusted under 35 U.S.C. 154(b) by 0 days.

(21) Appl. No.: 13/304,610

(22) Filed: Nov. 25, 2011

(65) Prior Publication Data

US 2012/0133112 A1    May 31, 2012

Related U.S. Application Data

(60) Provisional application No. 61/417,365, filed on Nov. 26, 2010.

(51) Int. Cl.
*B62B 5/00*    (2006.01)

(52) U.S. Cl.
USPC .............. 280/655; 280/47.18; 280/47.27; 280/47.29

(58) Field of Classification Search
USPC ........ 280/638, 35, 639, 38, 656, 47.131, 651, 280/652, 655, 47.17, 47.18, 47.2, 47.24, 280/47.27, 47.28, 47.29, 63, 64, 47.26
See application file for complete search history.

(56) References Cited

U.S. PATENT DOCUMENTS

| 5,186,479 | A |   | 2/1993 | Flowers |
| 5,201,536 | A |   | 4/1993 | Bono et al. |
| 5,356,197 | A |   | 10/1994 | Simic |
| 5,769,449 | A | * | 6/1998 | Keesee .................. 280/656 |
| 5,857,695 | A |   | 1/1999 | Crowell |
| 6,079,777 | A | * | 6/2000 | Simmons et al. .......... 297/217.1 |
| 6,375,200 | B1 | * | 4/2002 | Harter ................... 280/30 |
| 6,530,583 | B1 | * | 3/2003 | Mueller .................. 280/47.18 |
| 7,201,385 | B2 | * | 4/2007 | Renz et al. .............. 280/79.11 |
| 7,255,355 | B2 | * | 8/2007 | Chisholm et al. ........... 280/30 |
| 2005/0093273 | A1 | * | 5/2005 | McDonell ................ 280/656 |

* cited by examiner

*Primary Examiner* — John Walters
*Assistant Examiner* — Brian Swenson
(74) *Attorney, Agent, or Firm* — Matthew J. Lattig; Charter IP, LLC

(57) ABSTRACT

A wheeled apparatus includes a base having sides, a front, rear, upper surface and lower surface, with a pair of leaves forming sides of the base and pivotally connected thereto and a pair of gates forming the front and rear and pivotally connected to the base and leaves. A handle subassembly and a leg subassembly are connected to the base, with a wheel subassembly connected to the leg subassembly. The apparatus is configurable in a cart mode, a table mode with gates and leaves oriented in a flat horizontal plane, a dolly mode with leaves and gates connected to form a cart but with leg subassembly lowered closer to the ground relative to the cart mode, and a stowage mode, where the leaves and gates collapse into the base, the handle subassembly retracts into the base, and the leg subassembly collapses up into the lower surface of the base.

20 Claims, 28 Drawing Sheets

MULTI-FUNCTIONAL COLLAPSIBLE WHEELED APPARATUS

PRIORITY STATEMENT

The present application claims the benefit under 35 U.S.C. §119(e) of U.S. Provisional Patent Application Ser. No. 61/417,365 to the inventor, filed Nov. 26, 2010 and entitled "MULTI-FUNCTIONAL COLLAPSIBLE WHEELED APPARATUS", the entire contents of which is hereby incorporated by reference herein.

BACKGROUND

1. Field

Example embodiments in general are directed to a towable, wheeled apparatus for all-terrain use.

2. Related Art

Various attempts have been made to provide a practical way to transport personal belongings to a park, campsite, beach, etc. Many configurations have been created in an effort to develop a wheeled apparatus which is lightweight, folds for easy storage and transportability, is easily steered and maneuvered over a wide variety of surfaces, does not become disabled when used in sand or dirt terrains, can be used as a table, transports a wide variety of objects, and can support an umbrella.

Some wheeled apparatus can convert from a cart to a table, and vice versa. Some of these articles further may have the ability to collapse for purposes of stowage. Other wheeled apparatuses may convert between a cart and a dolly configuration, and may or may not collapse for stowage. Some of these convertible cart/table or cart/dolly apparatus may or may not be further configured for towing behind vehicles such as ATVs, golf carts, bicycles, etc.

SUMMARY

An example embodiment is directed to a multi-functional, collapsible wheeled apparatus. The apparatus includes a generally rectangular base, the base having a longer dimension representing sides thereof and a shorter dimension representing a front and rear thereof, the base having an upper surface and a lower surface. The apparatus further includes a pair of leaves and a pair of gates. Each leaf is pivotally connected along its lower end to a corresponding side of the base in opposite relation thereof by a plurality of horizontally arranged hinges located along the edge at the base upper surface. Each gate is in facing relation to each other at the front and rear of the base, a side of a front gate pivotally connected to a front side of one of the leaves by a plurality of vertical hinges so that the front gate is configured to swing inward to its connected leaf and outward to be secured to the opposite leaf so as to form a front side when the apparatus is placed in a cart mode, a side of a rear gate pivotally connected to a rear side of the other leaf by a plurality of vertical hinges so that the rear gate is configured to swing inward to its connected leaf and outward to be secured to the opposite leaf so as to form a rear side when the apparatus is placed in the cart mode. The apparatus further includes a handle subassembly attached to the base, a leg subassembly attached to the base, and a single pair of wheels connected to the leg subassembly. The apparatus is configurable in the cart mode, a table mode with the gates and leaves oriented in a flat horizontal plane, a dolly mode with the leaves and gates connected to form a cart but with the leg subassembly lowered closer to the ground relative to the cart mode, and a stowage mode where the leaves and gates collapse into the base, the handle subassembly retracts into the base and the leg subassembly collapses up into the lower surface of the base with the pair of wheels removed.

Another example embodiment is directed to a multi-functional, collapsible wheeled apparatus having a generally rectangular base with a longer dimension representing sides thereof and a shorter dimension representing a front and rear thereof, the base having an upper surface and a lower surface. The apparatus includes a pair of leaves, each leaf pivotally connected along its lower end to a corresponding side of the base in opposite relation thereof, and a pair of gates, each gate in facing relation to each other at the front and rear of the base, a side of a front gate pivotally connected to a front side of one of the leaves, a side of a rear gate pivotally connected to a rear side of the other leaf. The apparatus includes a handle subassembly attached to the base, the handle subassembly composed of a handle and a pair of latching pivot arms which permit pivotable movement of the handle inward and outward for stowage and removal. The pivot arms are compressed outward to rotate the handle inward and insert the handle subassembly into and beneath the base upper surface for stowage. The apparatus further includes a leg subassembly attached to the base, and a single pair of wheels connected to the leg subassembly. The apparatus is configurable in the cart mode, a table mode with the gates and leaves oriented in a flat horizontal plane, a dolly mode with the leaves and gates connected to form a cart but with the leg subassembly lowered closer to the ground relative to the cart mode, and a stowage mode where the leaves and gates collapse into the base, the handle subassembly retracts into the base and the leg subassembly collapses up into the lower surface of the base with the pair of wheels removed.

Another example embodiment is directed to a multi-functional, collapsible wheeled apparatus having a generally rectangular base with a longer dimension representing sides thereof and a shorter dimension representing a front and rear thereof, the base having an upper surface and a lower surface. The apparatus includes a pair of leaves, each leaf pivotally connected along its lower end to a corresponding side of the base in opposite relation thereof, and a pair of gates, each gate in facing relation to each other at the front and rear of the base, a side of a front gate pivotally connected to a front side of one of the leaves, a side of a rear gate pivotally connected to a rear side of the other leaf. The apparatus includes a handle subassembly attached to the base, and a dual cross-leg support connected to the lower surface of the base and expandable between vertically raised and lowered positions. The apparatus further includes a wheel subassembly connected to the dual cross-leg support. The wheel subassembly is composed of a central axle interposed between respective lower ends of one side of the dual cross-leg support, a pair of rotation cuffs attached to the bottom ends of the respective one side of the dual cross-leg support, each rotation cuff including a depressible button permitting rotation of a releasable wheel thereon from a position perpendicular to the axis of rotation of the apparatus to a position in-line with the axis of rotation, each wheel including a release button permitting selective attachment to and removal from its corresponding rotation cuff.

Another example embodiment is directed to a multi-functional, collapsible wheeled apparatus having a rectangular base with sides, a front, rear, upper surface and lower surface, a pair of leaves, each leaf pivotally connected along its lower end to a corresponding side of the base, and a pair of gates, each gate forming a respective front and rear of the base, a side of a front gate pivotally connected to a front side of one of the leaves, a side of a rear gate pivotally connected to a rear side of the other leaf. The apparatus further includes a handle subassembly attached to the base, a leg subassembly connected to the base and expandable between vertically raised and lowered positions, and a wheel subassembly connected to the leg subassembly. The apparatus is configurable in a cart mode, a table mode with the gates and leaves oriented in a flat horizontal plane, a dolly mode with the leaves and gates connected to form a cart but with the leg subassembly lowered closer to the ground relative to the cart mode, and a stowage mode where the leaves and gates collapse into the base, the handle subassembly retracts into the base and the leg subassembly collapses up into the lower surface of the base.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

DETAILED DESCRIPTION

The example multi-functional, collapsible wheeled apparatus described hereafter is configured to be positioned in various modes of use and/or configurations for employment on all terrains.

Figure 1:
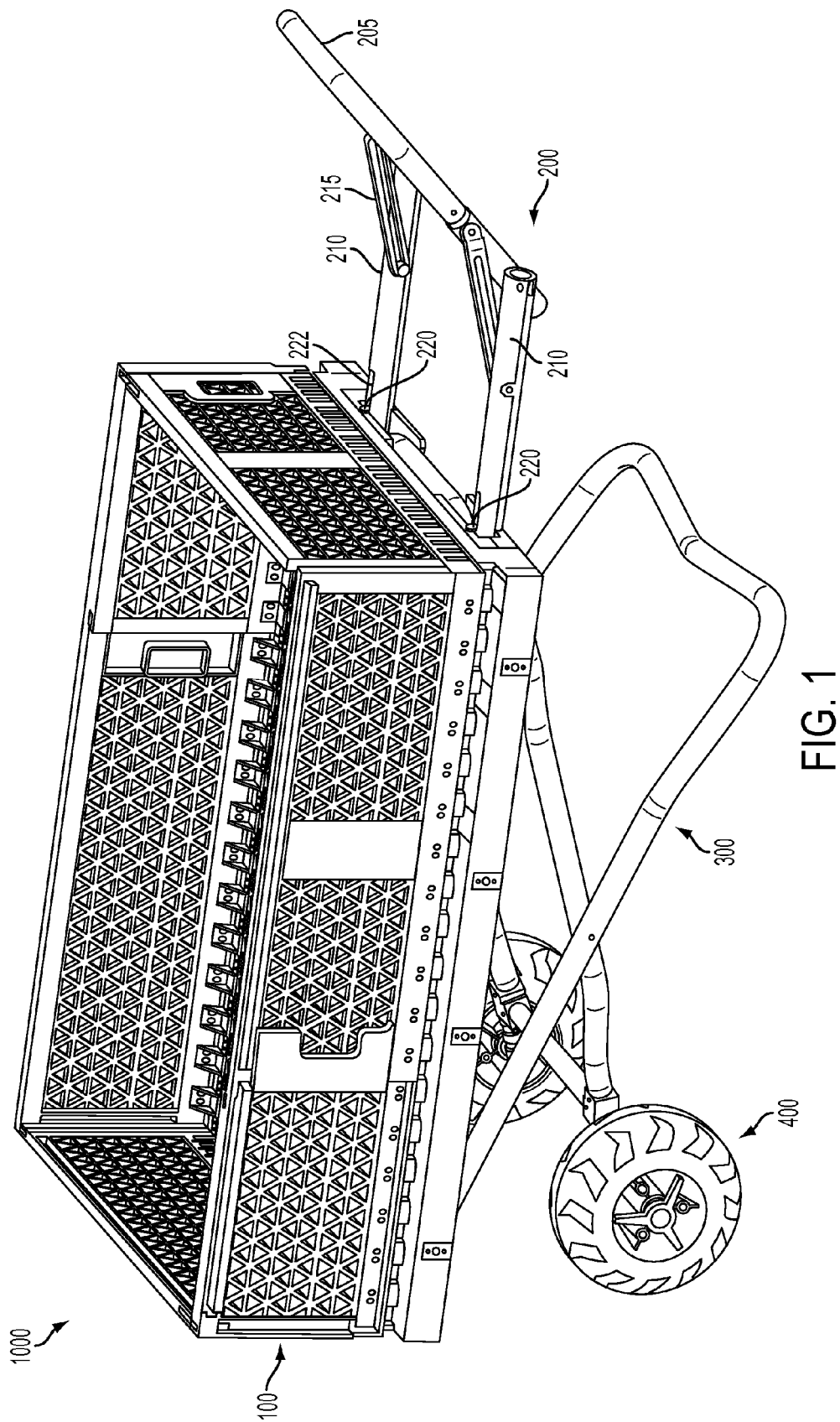
FIG. 1 is a perspective view of a cart mode of the apparatus in accordance with an example embodiment.
Figure 2:
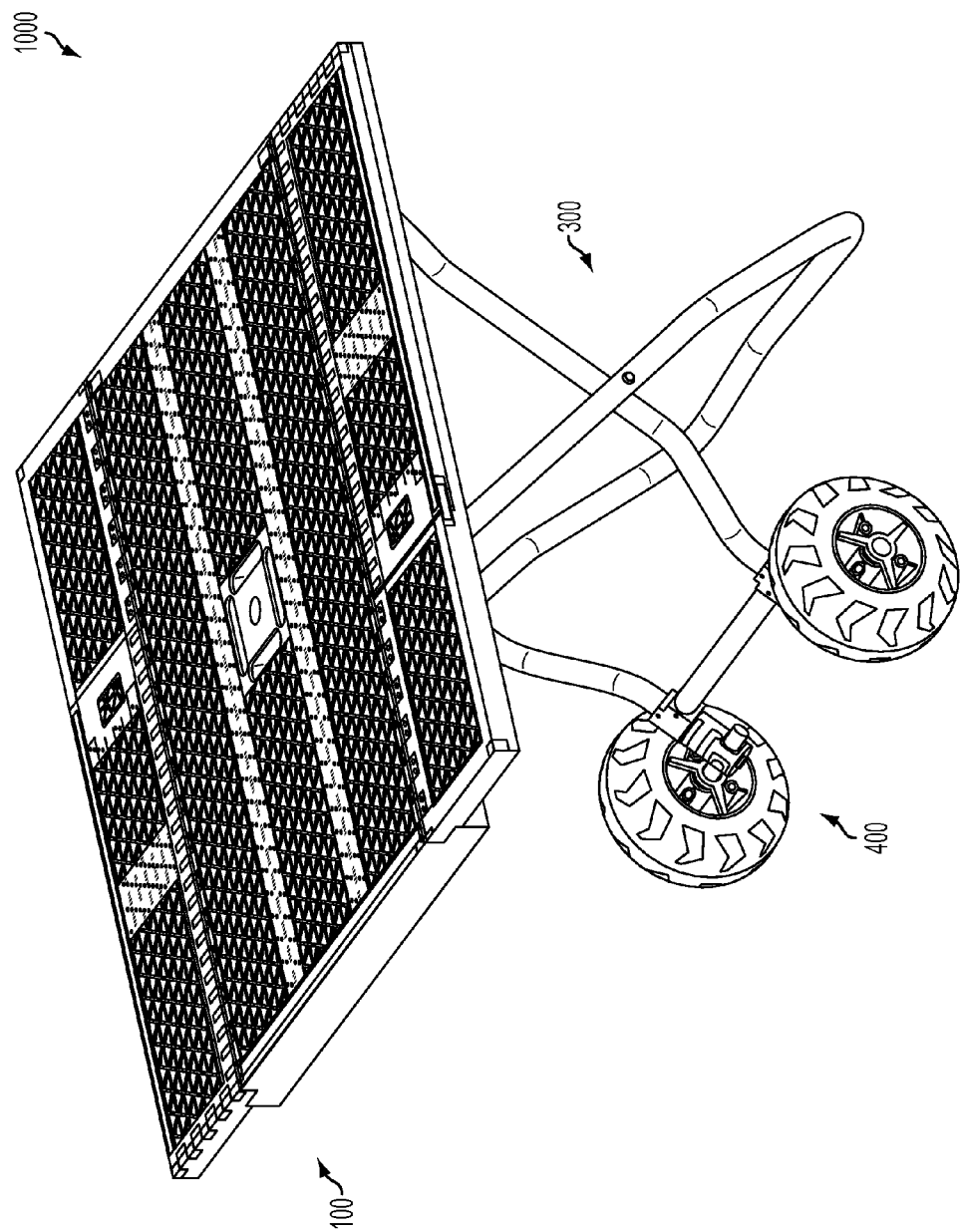
FIG. 2 is a perspective view of a table mode of the apparatus in accordance with an example embodiment.
Figure 3:
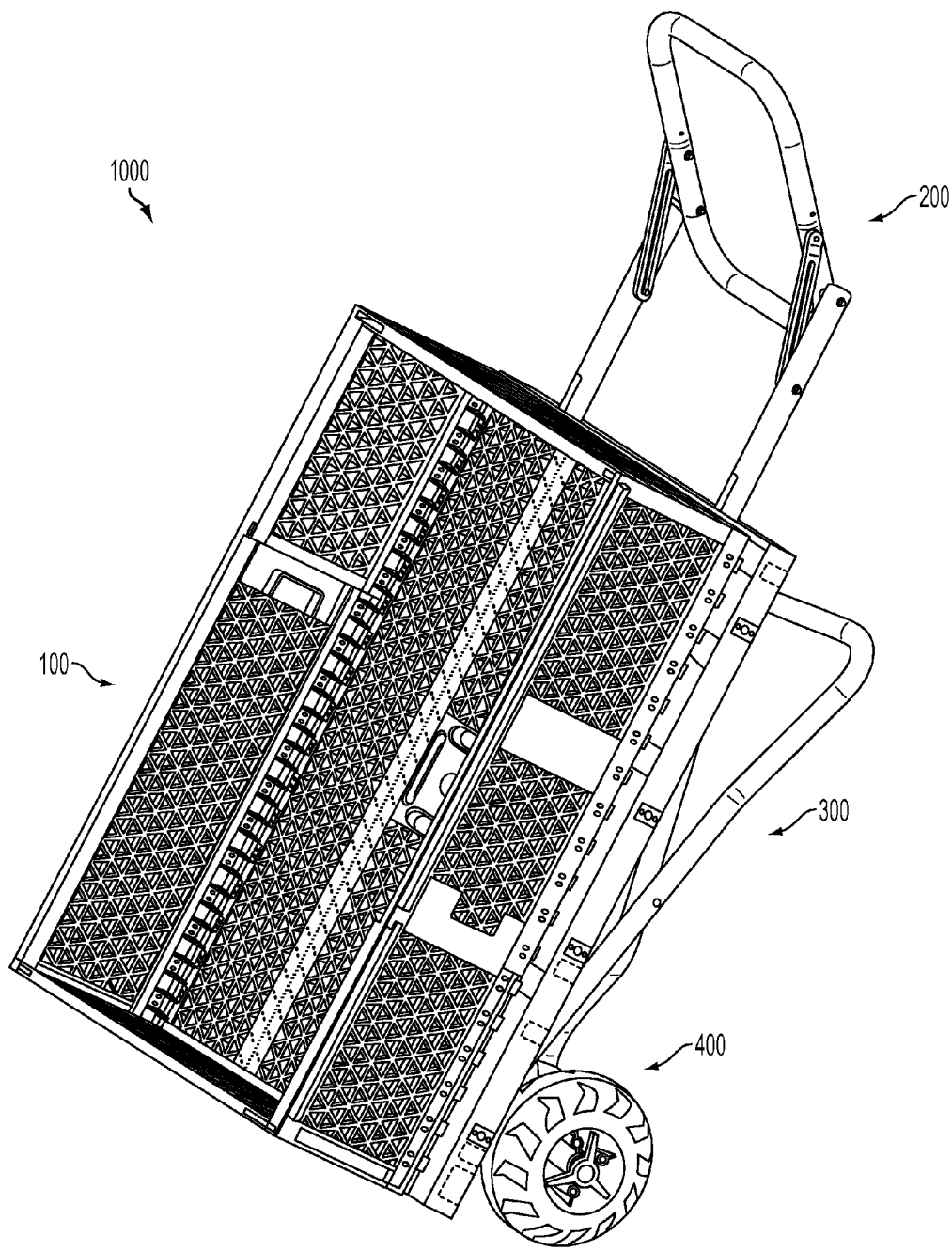
FIG. 3 is a perspective view of a dolly mode of the apparatus in accordance with an example embodiment.
Figure 4:
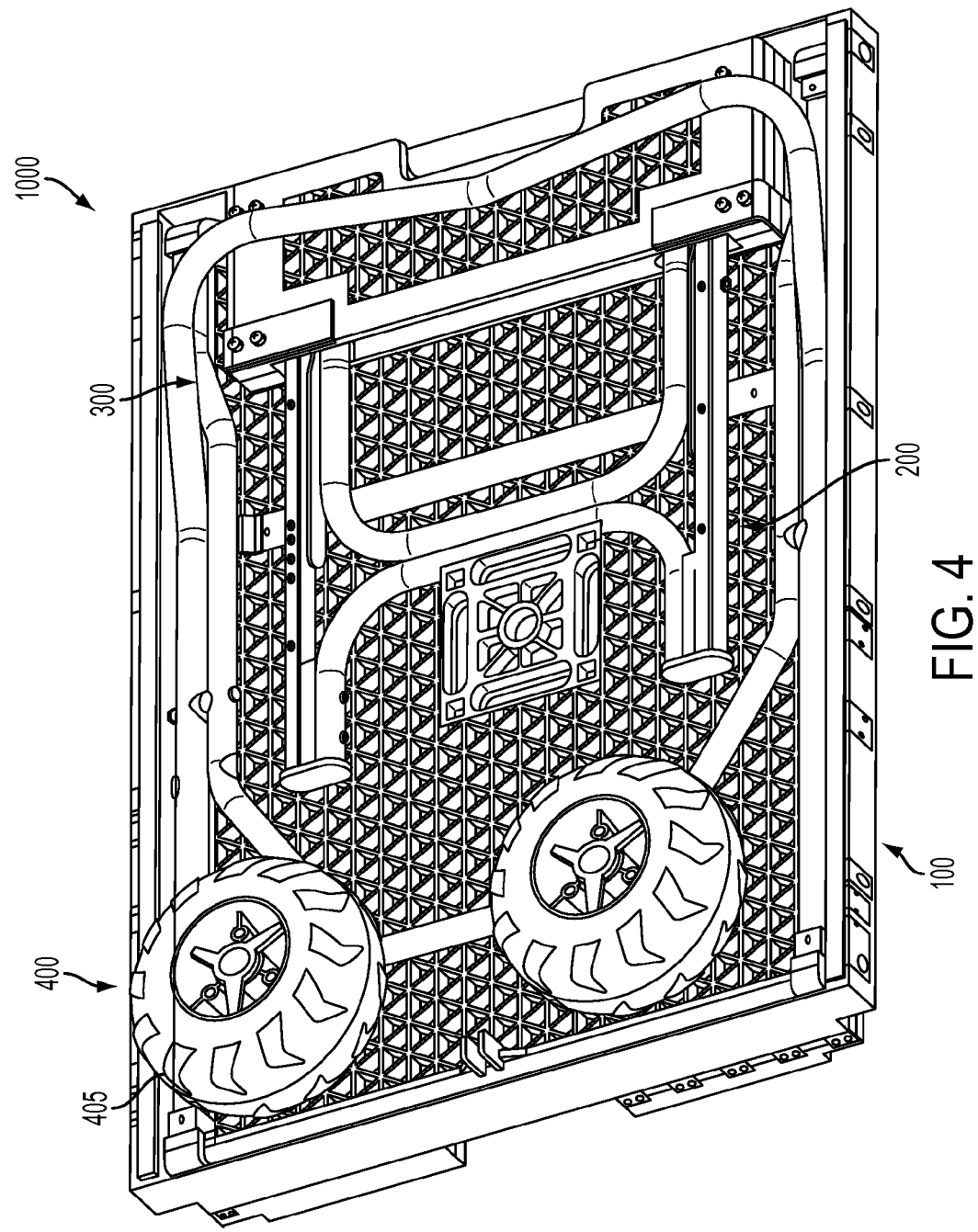
FIG. 4 is a perspective view of a stowage mode of the apparatus in accordance with an example embodiment.
Figure 5:
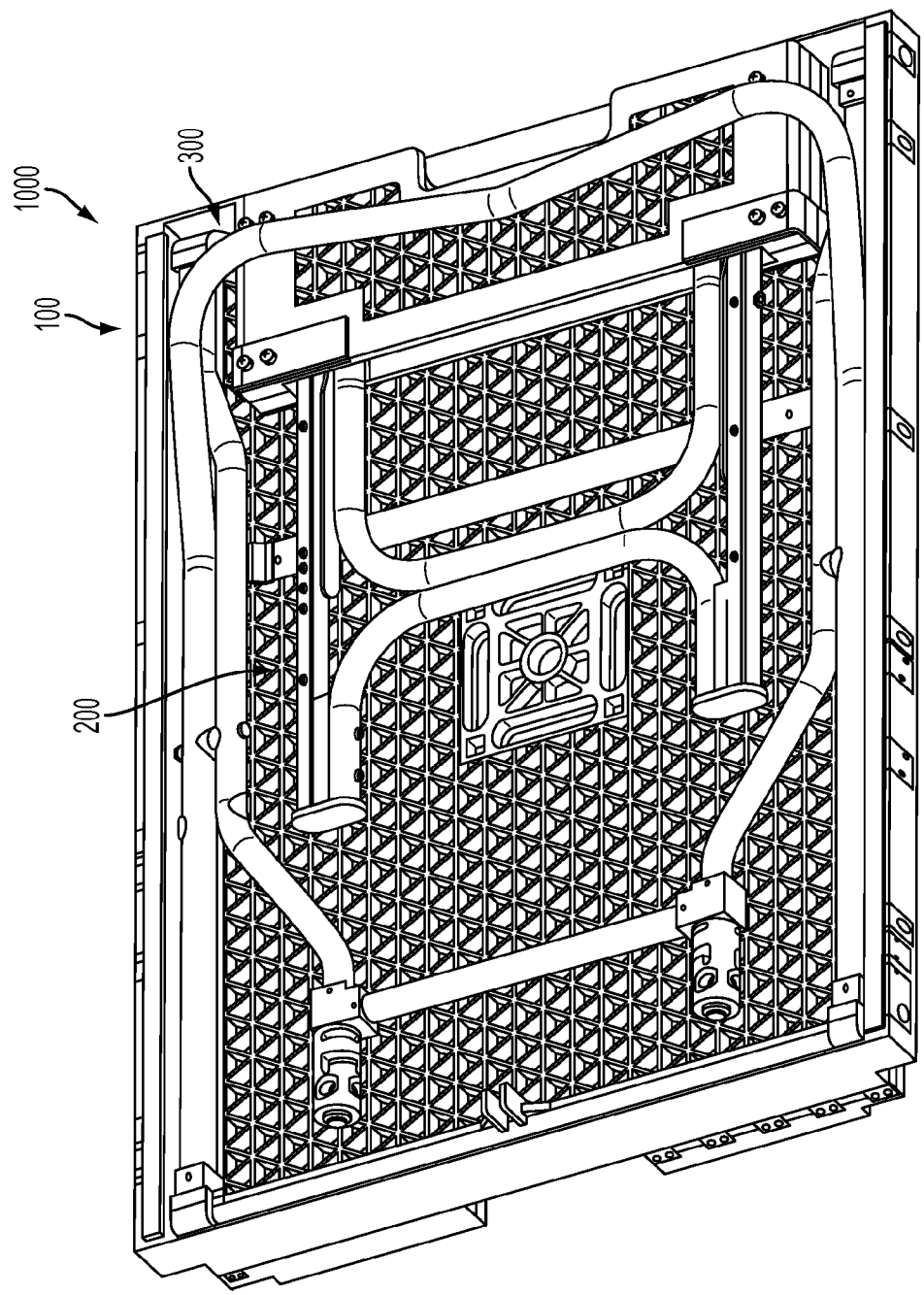
FIG. 5 is a perspective view of a stowage mode of the apparatus in accordance with another example embodiment.

FIG. 1 is a perspective view of a cart mode of the apparatus in accordance with an example embodiment; FIG. 2 is a perspective view of a table mode of the apparatus shown in FIG. 1; FIG. 3 is a perspective view of a dolly mode of the apparatus shown in FIG. 1; FIG. 4 is a perspective view of a stowage mode of the apparatus shown in FIG. 1; and FIG. 5 is a perspective view of a stowage mode of the apparatus in accordance with another example embodiment.

Referring collectively to FIGS. 1-5, and in general, there is described an example multifunctional, collapsible wheeled apparatus (hereafter "apparatus 1000"), which in one configuration may be placed in a cart mode (FIG. 1) for all terrain use, and which can readily convert into a table (FIG. 2). From one of the cart or table configuration, the apparatus 1000 can be reconfigured into a dolly configuration (FIG. 3). From one of the cart, table or dolly configuration, the apparatus 1000 can be placed into a collapsed or stowage configuration (FIGS. 4, 5) for storage into a suitable transport vehicle such as an automobile, closet, compartment, etc. Accordingly, the apparatus 1000 includes at least four existing modes; stowage, dolly, cart and table.

In an example, by providing a wheeled apparatus 1000 with the above multi-functional capabilities, a portable system in which transitions between set-up, conversion between use modes and stowage is realized in short order. In an example, the apparatus 1000 is designed to support a minimum of 150 pounds of weight, and in upwards to 300 pounds. In the cart mode shown in FIG. 1, the apparatus 1000 may have example dimensions of at least 26 inches wide, 36 inches long and 9 inches high with a capacity of at least 5 cubic feet. With modular accessories, the height may be at least doubled to 18 inches, increasing capacity to 9.75 ft³.

Due to the structure of its wheels 405, described in further detail hereafter, the apparatus 1000 is designed to be pulled or towed easily over all terrains including soft sand. In its table mode, the apparatus 1000 converts to a stable height-adjustable table up to, in one example, 30 inches above ground. In another example, the table may be set to a height above ground of 27 inches. Example dimensions of the table include a width of at least 3 feet and a length of at least 4 feet.

Upon converting from the table (or cart) configuration to the dolly mode, and in an example, the apparatus 1000 can be configured into a portable dolly accessory with a max track width of at least 29 inches. The dolly mode can quickly translate into a compact stowage mode. The stowage configuration of the apparatus 1000 may realize example dimensions of approximately 29 inches wide, 39 inches long and approximately 10 inches height, reducing apparatus 1000 height/depth profile to approximately 6 inches, in an example where the wheels 405 are removed.

In general, apparatus 1000 may be composed of several interconnected subassemblies. For example and referring to FIG. 1, apparatus 1000 includes a cart/table subassembly 100, and a handle subassembly 200 attached to cart/table subassembly 100. A handle 205 of handle subassembly 200 is pivotable via latching pivot arms 215, and handle subassembly 200 is removably insertable via slider arms 210 (FIGS. 4, 5) into the cart/table subassembly 100. Further, slotted recesses 222 when exposed release tensioned stop buttons 220 which prevent inward movement of the slider arms 210 when the handle subassembly 200 is fully withdrawn for use in cart/dolly modes, providing a safety feature for the apparatus 1000.

Additionally, subassemblies 100 and 200 are supported on a leg subassembly 300 to which a wheel subassembly is connected thereto. The leg subassembly is collapsible up into an underneath surface of the cart/table subassembly 100 for stowage mode (FIGS. 4, 5)

Figure 6:
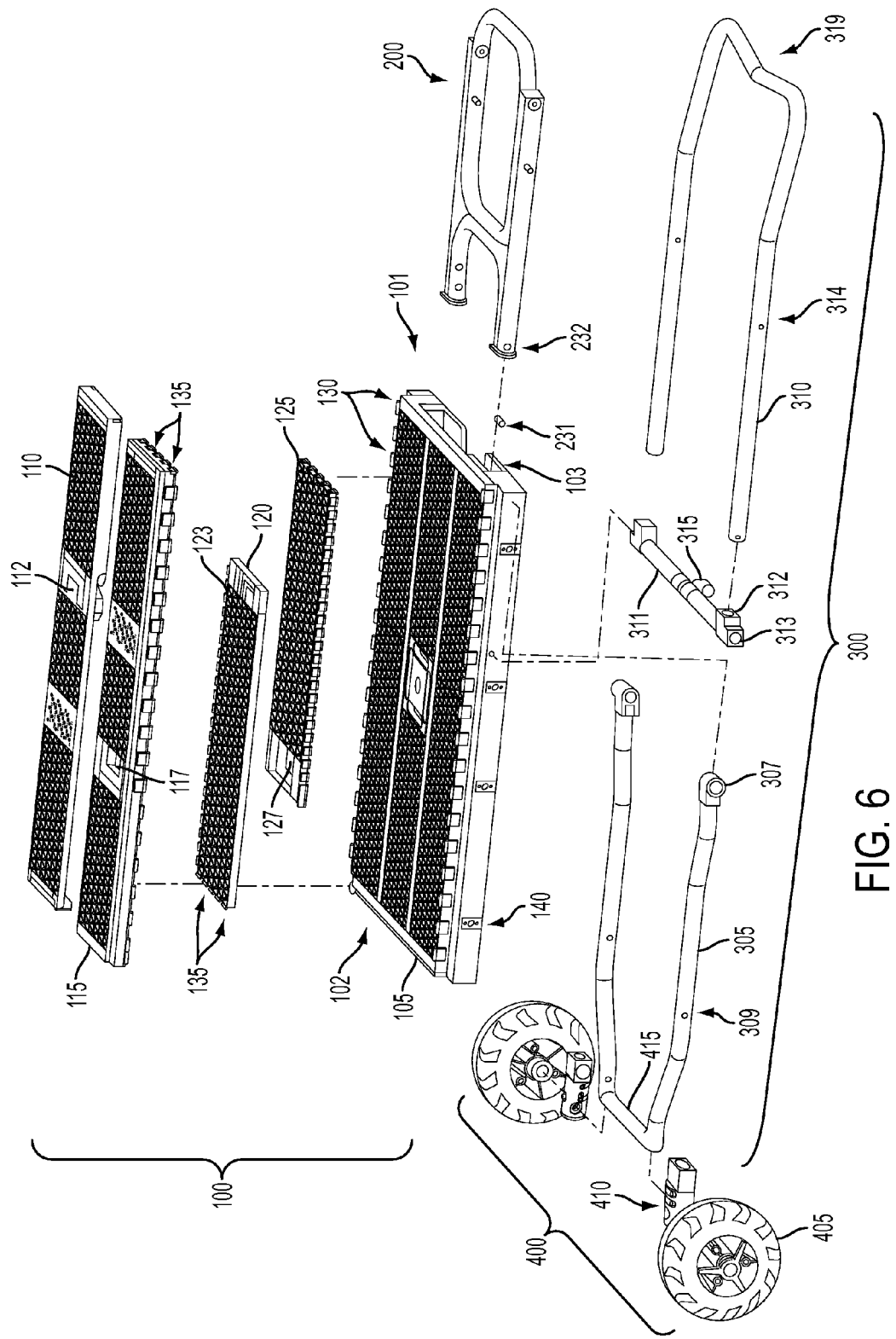
FIG. 6 is an exploded parts diagram view to illustrate constituent components of the apparatus in more detail.

FIG. 6 is an exploded parts diagram view to illustrate constituent components of the apparatus in more detail. In FIG. 6, subassembly component grouping are shown generally by brackets. For the cart/table subassembly 100, there is provided a generally rectangular base 105. The base 105 has a longer dimension representing sides thereof, and a shorter dimension representing a front 101 and rear 102 thereof (shown generally by arrows in FIG. 6). The base 105 has an upper surface and a lower surface, with each side including a ridge 106 (see arrow, shown in more detail in later figures) formed along an entire length thereof below an edge of the base 105 upper surface, The cart/table subassembly 100 includes a pair of leaves 110, 115. Each leaf 110, 115 is pivotally connected along its lower end to a corresponding side of the base 105 in opposite relation thereof by a plurality of horizontally arranged hinges 130 located along the edge at the base upper surface. This connective arrangement shall be described in further detail hereafter.

The cart/table subassembly 100 includes a pair of gates front gate 125 and rear gate 120. Each gate 125/120 is in facing relation to one other at the front 101 and rear 102 of the base 105. As to be shown in more detail hereafter, a side of the front gate 125 is pivotally connected to a front side of leaf 110 by a plurality of vertical hinges 135 so that the front gate 125 is configured to swing inward to its connected leaf (table mode) and outward to be secured to the opposite leaf 115. This latter motion will form the front of the apparatus 1000 when placed in cart mode. Similarly, a side of the rear gate 120 is pivotally connected to a rear side of leaf 115 by a vertical hinges 135 so that it too can swing inward toward its connected leaf 115 (Table mode) and outward to be secured to the opposite leaf 110 so as to form a rear side when the apparatus is placed in the cart mode.

Each leaf 110 and 115 has a corresponding hand hold 112, 117 formed therein. Each gate 120, 125 also have corresponding hand holds 123, 127 formed therein. Each swinging gate end is secured to its mating leaf end in cart mode (or released) by a latching mechanism to be described in more detail hereafter.

Each leaf 110, 115 include a recess enabling its corresponding gate 120, 125 to fold therein. This is so the outer facing surfaces of gate and leaf are flush, enabling a flat planar surface when pivoting the gate 110/115 and associated leaf 120/125 outward and downward for table mode, or enabling the leaf and connected gate to be pivoted inward and downward on top of the base 105 in preparation for stowage mode. This will be shown in more detail hereafter.

The base 105, leaves 110/115, and gates 120/125 have been designed with an isogrid structure of equilateral triangles to prevent toppling by wind and avoid collection of sand and/or debris. Structural materials that form the base 105, leaves 110/115 and gates 120/125 and various connector elements are designed with corrosion avoidance properties in mind, ruggedness and aesthetic properties. Example materials for the base 105, leaves 110/115 and gates 120/125 may include HDPE or PPE plastic. Example materials for various other connector components or leg subassembly components to be described hereafter include anodized aluminum tubing and/or stainless steel hardware, for example.

The handle subassembly 200 shall be described in more detail hereafter, it being shown in FIG. 6 that slider arms 210 ride within a guide track of a recess 235 formed by a boss block 103 beneath base 105. A stop pin 231 catches flanges 240 (shown by arrow 232) to prevent the handle subassembly 200 from being fully removed from recess 235.

General components of the leg subassembly 300 are shown in FIG. 6; additional details thereof shall be shown hereafter. In general, the leg subassembly 300 includes a pair of guide rails (not shown). Each guide rail is attached along an inside side surface of the base 105. Each guide rail has a plurality of leg detent positions formed therein which determine the height of the base 105 above ground. Hence, this determines the apparatus base upper surface height from ground for cart, table and dolly modes.

The leg subassembly 300 includes a cross-leg support. The support is composed of a pair of wheel-connected legs 305 crisscrossed with a non-wheel connected support stanchion 310. The holes at 309/314 are aligned and secured by pivot pins, (not shown) as is known. Each upper end 307 of the wheel-connected legs 305 is hard connected into a corresponding end of the guide rails. Each upper end 312 of the non-wheel connected stanchion 307 is slidable in a corresponding guide rail between selected detent positions. This shall be shown in more detail hereafter.

The leg subassembly 300 includes a selector 315. The selector 315 is designed to adjust the apparatus 1000 in height (of base 105 above ground) by switching between the leg detent positions in the guide rails to shift between cart, table and dolly modes.

The leg subassembly 300 has the wheel subassembly 400 connected thereto. The wheel subassembly 400 comprises a pair of wheels 405 connected to a common axle 415 via a corresponding rotation cuff assembly 410. The rotation cuff assembly 410 facilitates the wheels 405 to be rotated 90 degrees between its stowage position, such as is shown in FIG. 4, to its in-line or operating position in the cart and/or dolly modes as shown in FIGS. 1 and 3 for example.

Accordingly, apparatus 1000 is configurable in the cart mode, a table mode with the gates 120/125 and leaves 110/115 oriented in a flat horizontal plane, a dolly mode with the leaves 110/115 and gates 120/125 connected to form a cart but with the leg subassembly 300 lowered closer to the ground relative to the cart mode so as to facilitate loading and towing objects therein, and a stowage mode where the leaves 110/115 and gates 120/125 collapsed into the base 105, the handle subassembly 200 retracted into the base 105 and the leg subassembly 300 collapsed up into the lower or underside/bottom surface of the base 105. In an example, the pair of wheels 405 may be removed for ease of stowage and/or to further reduce the thickness/depth profile of the apparatus 1000.

Figure 7:
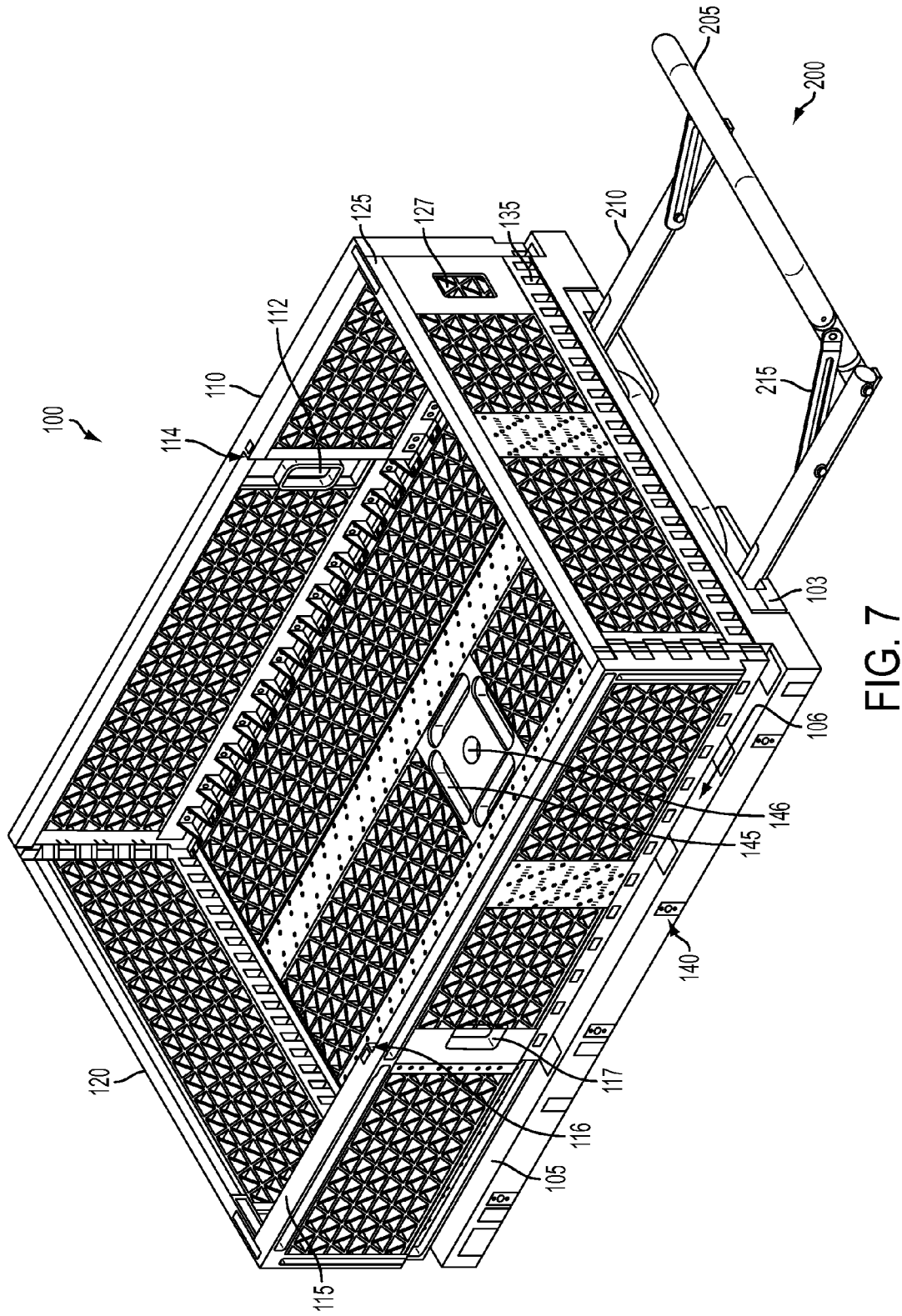
FIG. 7 is a perspective view of part of the apparatus to show features of the cart/table subassembly with handle subassembly extended in more detail.
Figure 8:
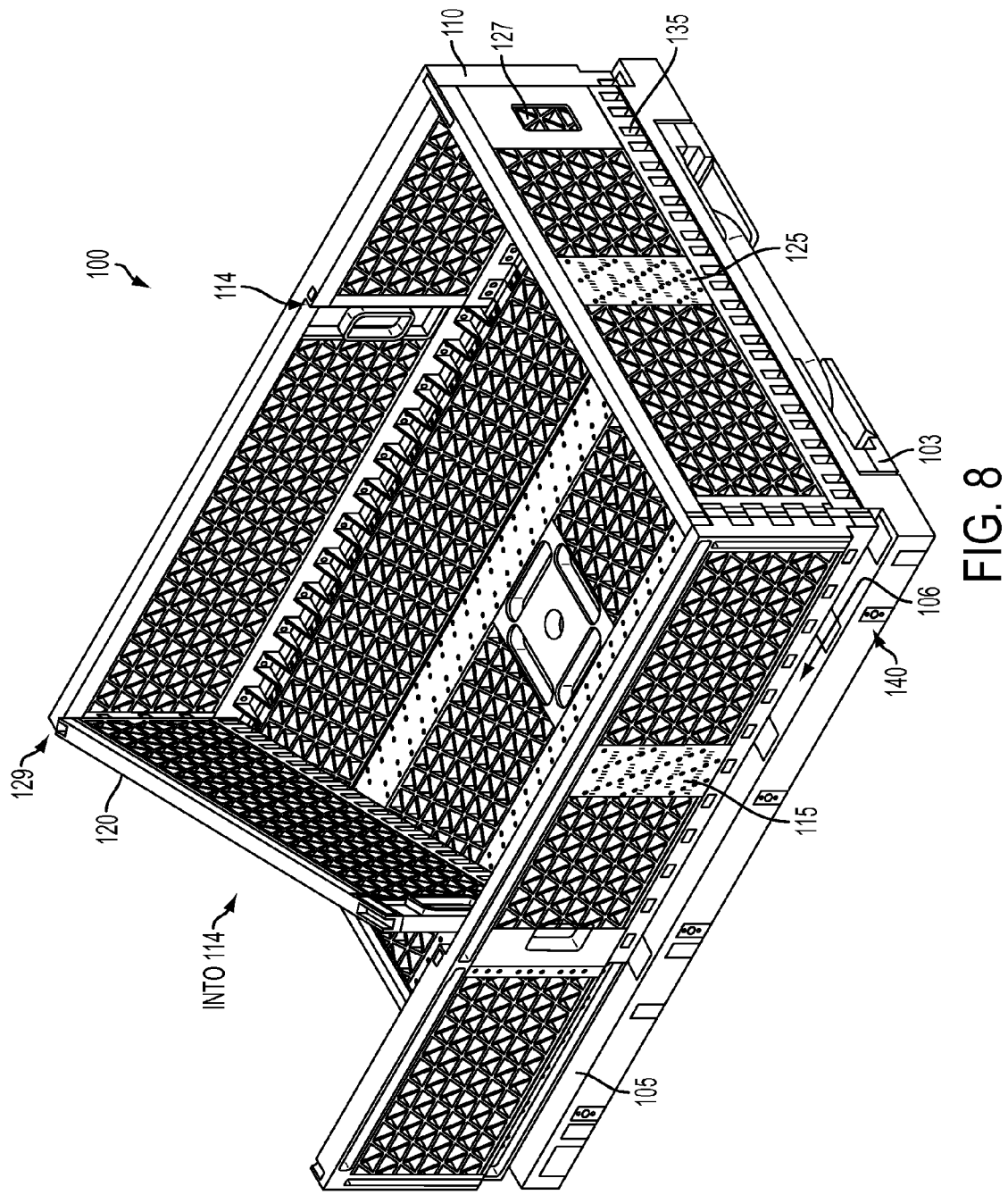
FIG. 8 is a perspective view of part of the apparatus to show features of the cart/table subassembly with handle subassembly retracted to shift from cart mode to any of table or stowage modes, in more detail.
Figure 9:
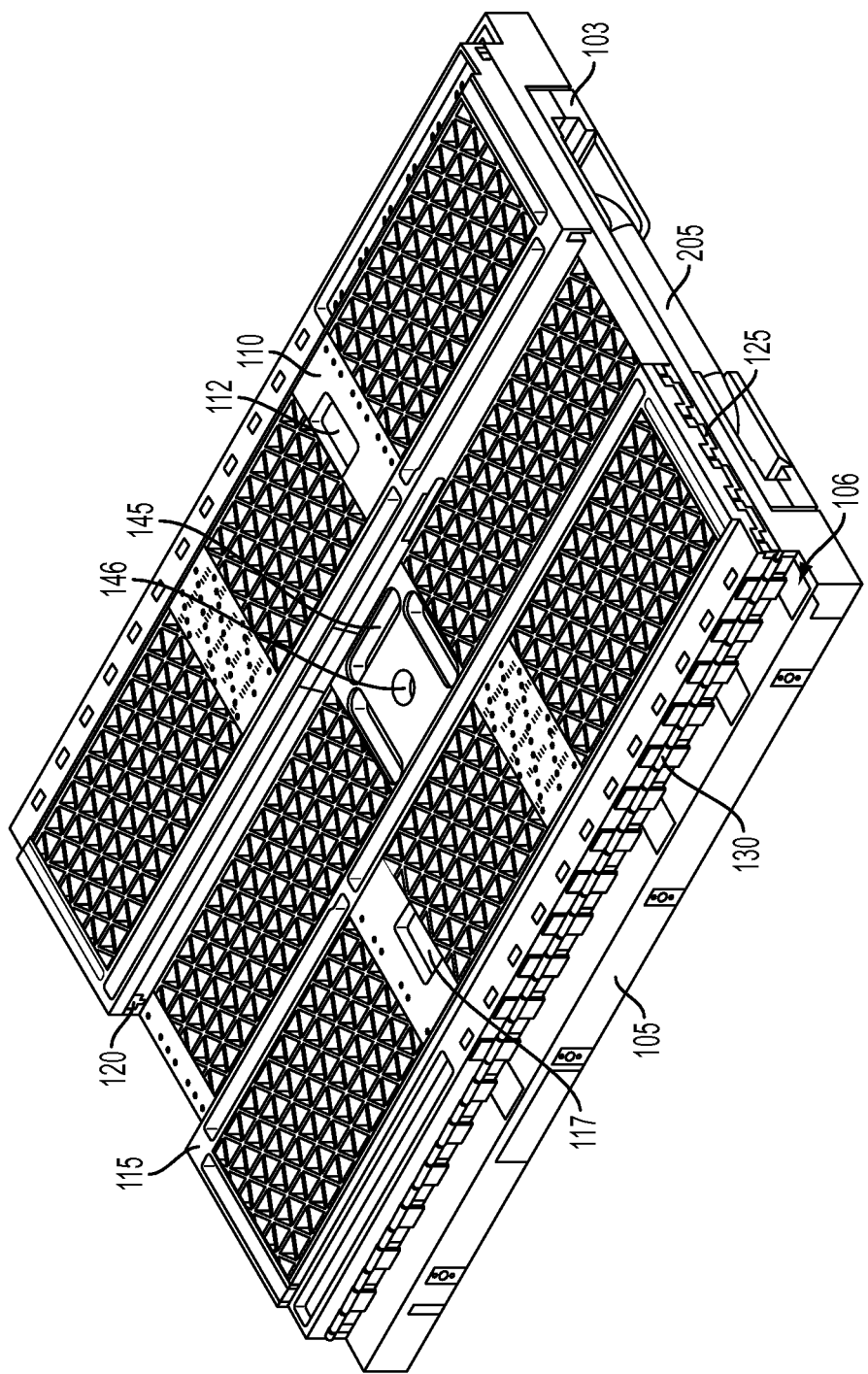
FIG. 9 is a perspective view of the cart/table subassembly to describe an intermediate step of shifting between cart and table/stowage modes or vice versa according to an example embodiment.

FIGS. 7-10 are perspective views of part of the apparatus to show selected features of the cart/table subassembly; with FIG. 7 illustrating the handle subassembly extended; FIG. 8 illustrating the handle subassembly retracted to shift from cart mode to any of table or stowage modes, FIG. 9 illustrating an intermediate step of shifting between cart and table/stowage modes or vice versa, and FIG. 10 a view of the cart/table subassembly in table mode.

Referring to FIG. 7, in cart mode, it can be more clearly seen where leaf 110 is, pivotally connected along its lower end to a side of the base 105 by the horizontally arranged hinges 130 located along the edge at the base 105 upper surface. It can also be seen how the front gate 125 connects to leaf 115 via vertical hinges 135 (or leaf 110 connects to rear gate 120 via hinges 135). Both of gates 120/125 are design to swing inward. Additionally, ridge 106 may be more clearly seen down the entire length of the side edges of base 105. Further, a recess 151 which houses a gate latching pin 150 (not shown) can be seen. This secures each of the gates 120/125 into base 105 and to its opposite leaf 115/110 for cart/dolly mode. The operation of gate latching pin 150 shall be described in more detail hereafter.

Also shown in FIG. 7 are the recesses 114/116 in the leaves 110/115 that are designed to receive gates 120/125. Further, central hand holds 145 are shown on the upper surface of base 105 as well as a central aperture 146 designed to receive and secure an umbrella pole therein. In another example, a variable width or telescoping locking mount replaces fixed aperture 146 so as to be able to accommodate umbrella poles having variable diameters.

Figure 10:
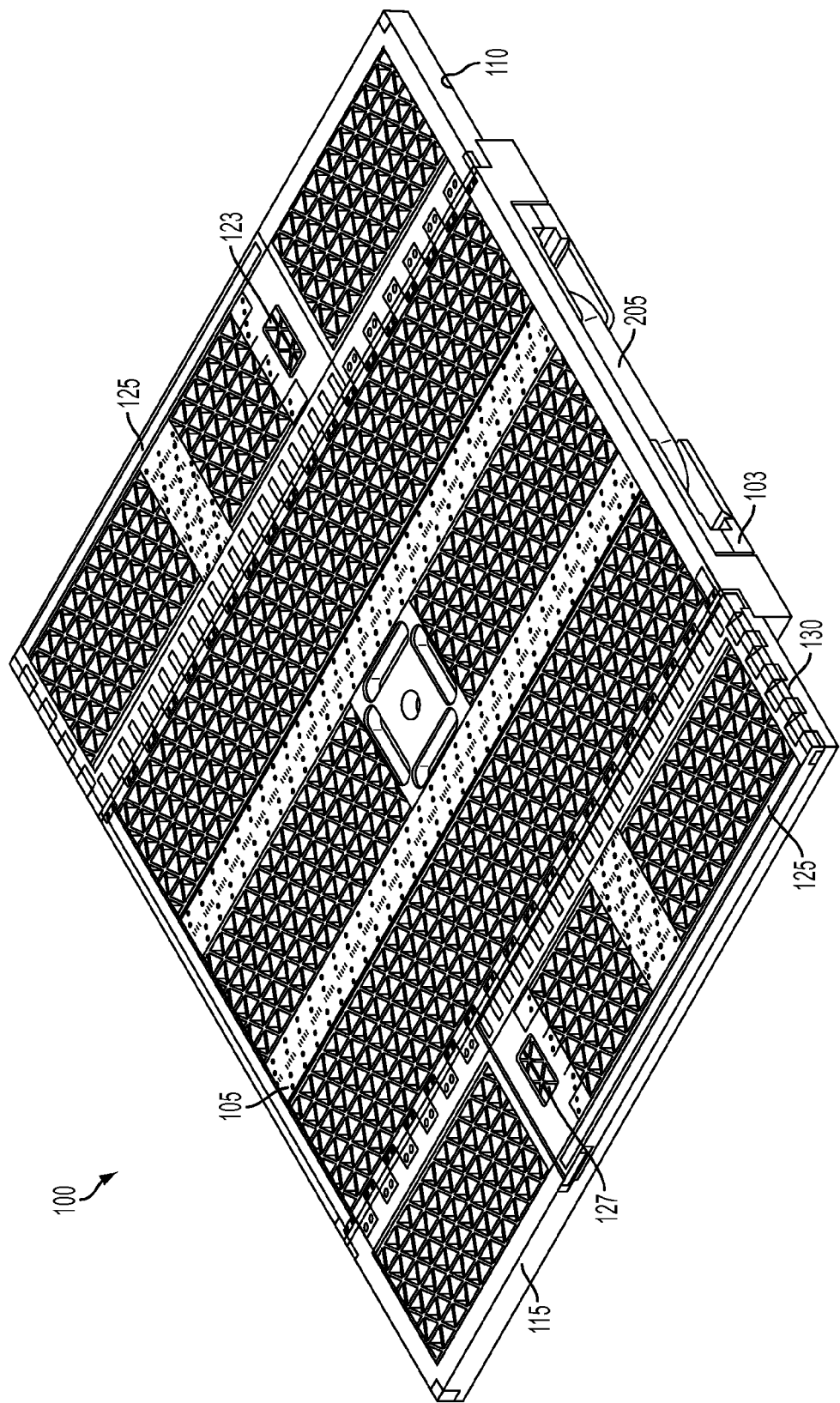
FIG. 10 is a perspective view of the cart/table subassembly in table mode.

FIG. 8 illustrates the direction of travel of gate 120 into the recess 114 formed in leaf 110. The user lifts gate latching pin 150 out of a hole in base 105, swings gate 120 inward so that it pivots via vertical hinges 135 at a pivot point 129 inward and toward the recess 114. Once in place, the gate latching pin 150 engages a hole in base 105 to lock the gate 120 flush up against the inside surface of leaf 110 so that the hand holds 123 and 117 align and the gate/leaf presents a flush surface. Similarly, a user lifts gate latching pin 150 (exposed through hand hold 127) to disengage gate 125 from leaf 110, swings it inward so as to engage recess 116, then releases gate latching pin 150 so that it engages a hole in base 105, locking gate 125 abutted up against leaf 115 in flush relation. Both leaves 110/115 with their attach gates then can be folded inward (for stowage, as shown in FIG. 9), or outward (for table mode, as shown in FIG. 10). In either mode, the handle subassembly 200 has been retracted and stowed beneath the base 105 of the car/table subassembly 100, as only part of handle 205 can be seen in the recess 235 formed by boss block 103.

FIG. 9 illustrates a stowage position with each leaf 110/115 (or gate 120/125) having a single hinge. However, a flat configuration for stowage may be achieved in another embodiment by raising the height of the gates and leaves so that when folded the leafs 110/115 meet at the center, or forming both of the leafs 110/115 of double-hinge construction, for example. In a further embodiment, the pair of gates 120/125 (or the pair of leafs 110/115) may simply fold up (cart), inward (stowage) or down (table), with the other pair of leafs/gates sliding into place, such as a stake-bed truck configuration.

Figure 11:
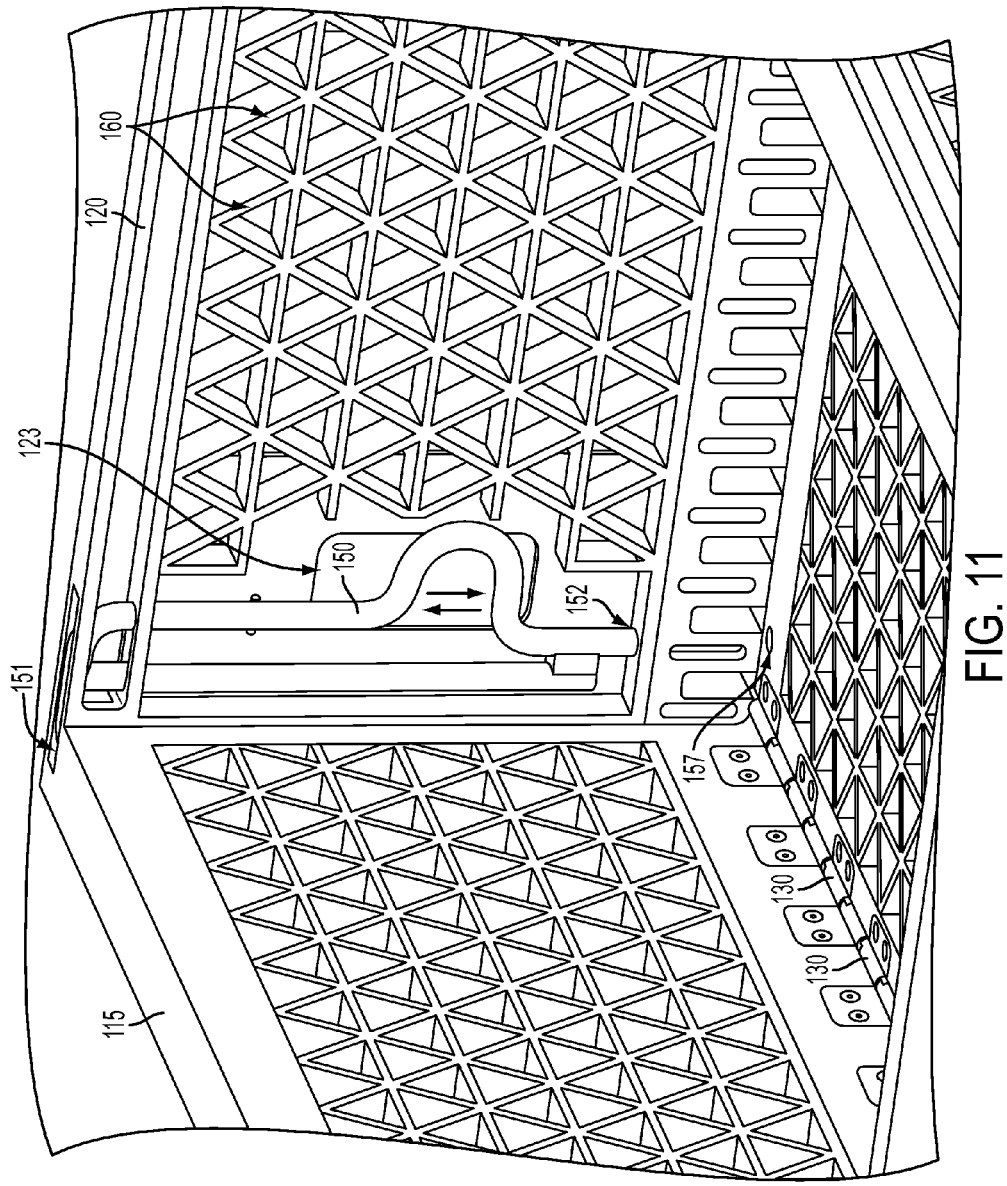
FIG. 11 is a partial close-up view of a corner of the apparatus in cart or dolly mode to illustrate the gate latching pin in more detail.

FIG. 11 is a partial close-up view of a corner of the apparatus in cart or dolly mode to illustrate the gate latching pin in more detail. For this example, the connective engagement between the rear of leaf 115 and side of rear gate 120 is described. The "latch end" of each gate 120/125 may be configured for a tongue and groove or interference fit engagement to its corresponding leaf end 115/110. However, this is still not sufficient to contain heavy portage. Accordingly a latching mechanism has been developed. Accessible through a hand hold (here 123), to disengage on end of gate 120 from leaf 115, the gate latching pin 150 is lifted vertically up through recess 151 (and guide hole 152) to disengage slot hole 157 formed in upper surface of base 105. Similar slot holes 157 are formed by recesses 114/116. The gate 120 is then swung inward and pivots on vertical hinges 135 (not shown) toward its recess 114. Once in position, the gate latching pin 150 is released, whereby it engages its corresponding slot hole 157 in base 105.

Although obscured in FIG. 11 by the connection between the gate 125 and leaf 115, the side outer surface of the gate 125 and the side end interior surface of the gate 115 engage by a tongue and groove arrangement to prevent lateral movement outward of the gate 125, and to ensure proper alignment of the gate latching pin 150 over the slot hole 157. A lengthwise tongue is formed along the side end of the gate 125. As the gate 125 is swung toward the end of leaf 115 for pin 150 engagement, the tongue engages a vertical groove formed in the leaf 115 side end interior surface, and is bounded within a grooved channel. This provides secondary securement should the gate latching pin come unlatched for any reason.

FIG. 11 also illustrates the constructions of the gates and leaves in more detail. In particular, the isogrid structure of equilateral triangles 160 is shown in more clarity. This arrangement may help prevent toppling of the apparatus 1000 by wind and avoid collection of sand and/or debris thereon. The example embodiments are not so limited to this structural design however; as other geometric shapes are contemplated.

In general, primary components of the cart/table subassembly 100 may be injection molded plastic such as PPE. The tabletop surface itself may be a lightweight isogrid-through-webbing hard plastic material such as polypropylene, HDPE or PPE, for example. In an example, the hinges to be discussed hereafter may be arranged in a snap-together fashion as snap-together hinges, reducing the hardware necessities thereof.

Figure 12:
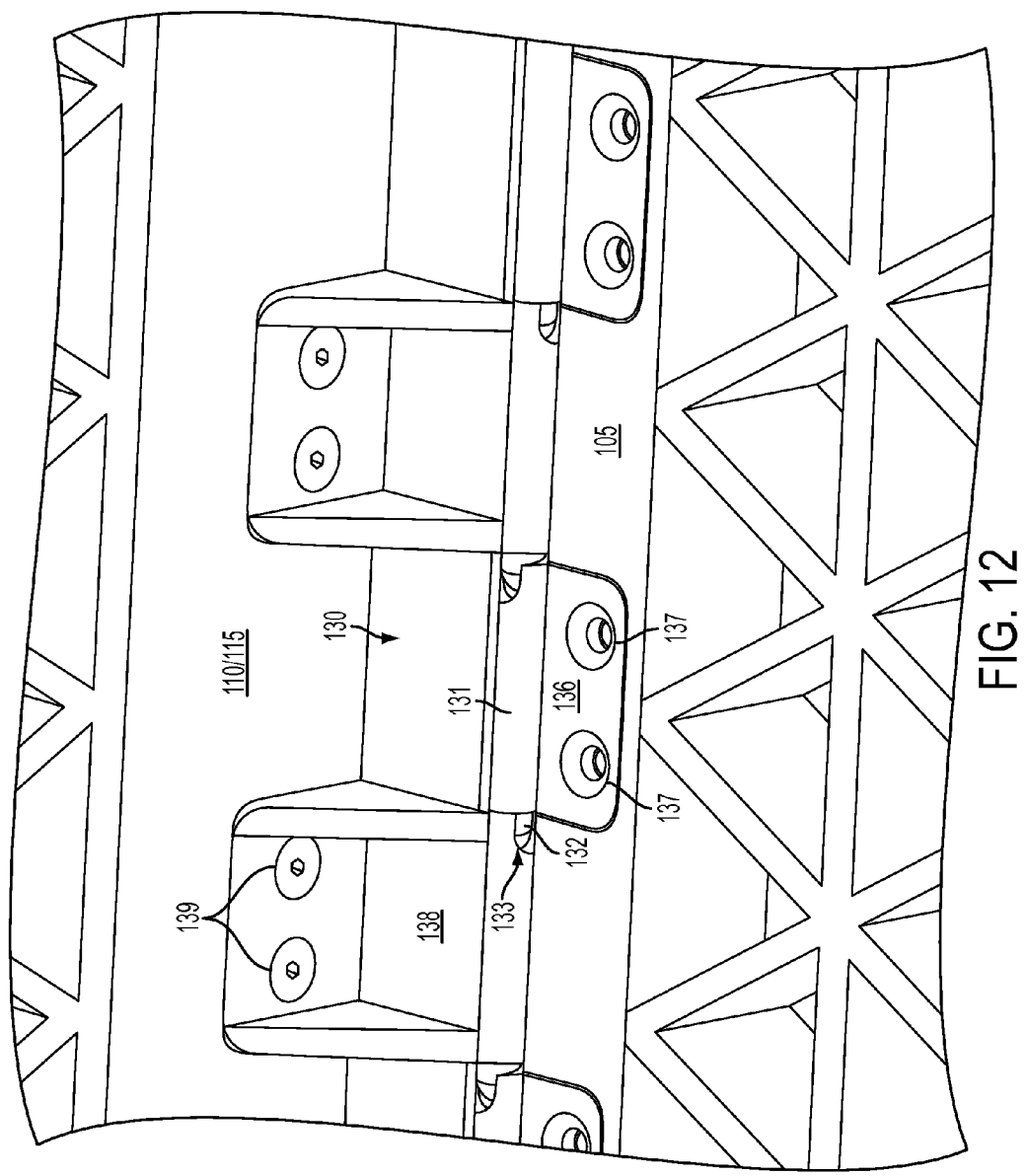
FIG. 12 is a partial close-up view of a junction between a leaf and the base of apparatus to illustrate the horizontal hinges in more detail.

FIG. 12 is a partial close-up view of a junction between a leaf and the base of apparatus to illustrate the horizontal hinges in more detail. Here a junction between a leaf 110/115 to base 105 edge is shown, secured by a plurality of horizontal hinges 130. Each hinge 130 is actually a two-part assembly, part formed as part of the leaf 110/115, part formed as part of base 105. Each hinge 130 has a male component 132 and a female component 131, and these components 131/132 match the components on the adjacent parts/hinges 130 to be mated, show here as adjacent mating point 133 of part 138, connected to a leaf 110/115 by fasteners 139, and flap 136 of hinge 130, which is connected to base 105 by fasteners 137. Although fasteners 137, 139 are shown, flap 136 and 138 may be integrally molded as parts of base 105 and leaf 110/115 respectively. While the male component 132 is direction independent, the female component 131 requires indexing. The two components 131/132 are aligned correctly, snap together and are held by friction.

Figure 13:
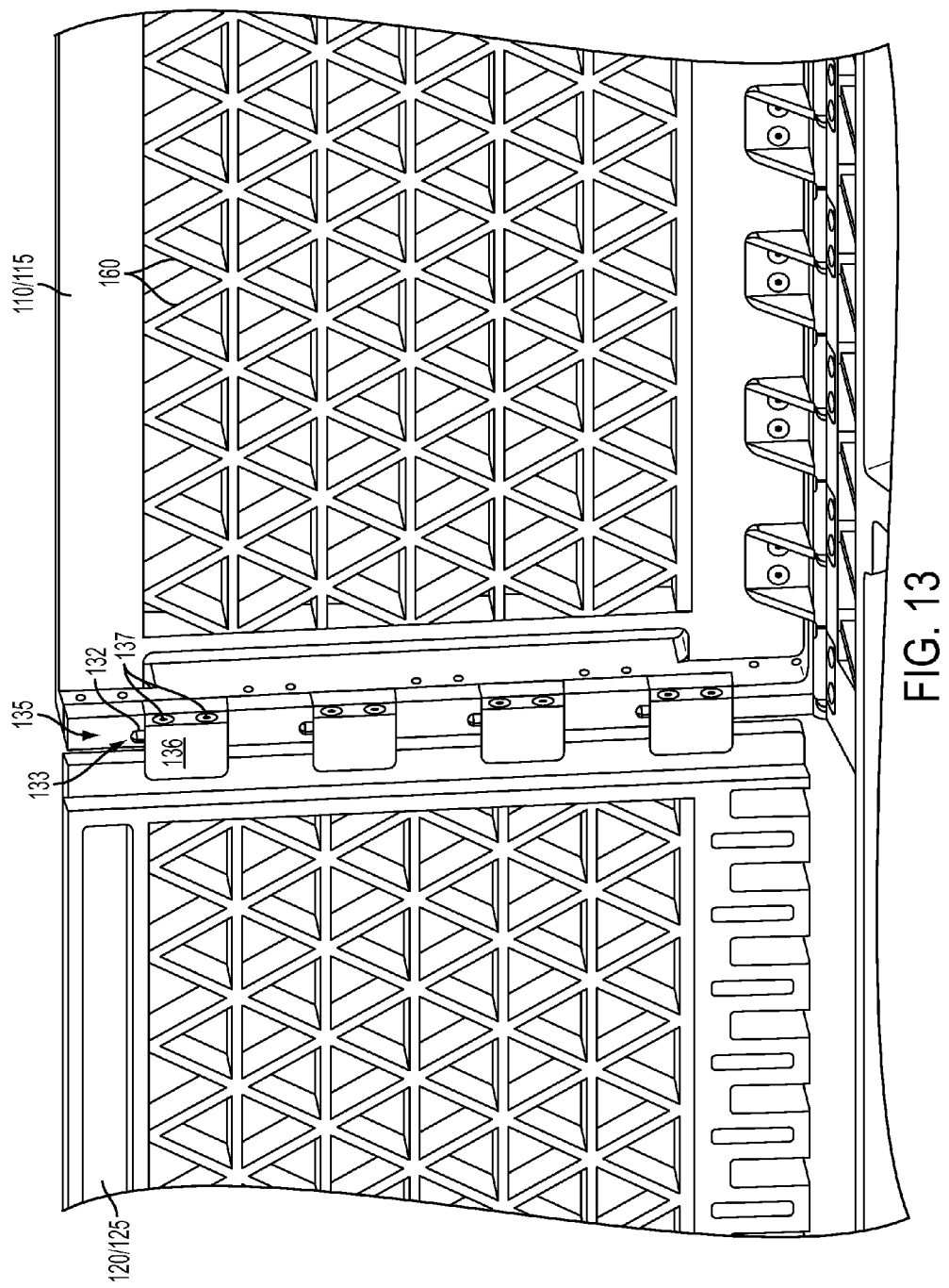
FIG. 13 is a partial close-up view of a junction between a leaf and a gate of apparatus in cart/dolly mode to illustrate the vertical hinges in more detail.

FIG. 13 is a partial close-up view of a junction between a leaf and a gate of apparatus in cart/dolly mode to illustrate the vertical hinges in more detail. Here a junction between a gate 120/125 to leaf 110/115 edge is shown, secured by a plurality of vertical hinges 135. Each hinge 135 is actually a two-part assembly, similar to as described in FIG. 12. Each hinge 135 has a male component 132 and a female component 131 (obscured), and these components 131/132 match the components on the adjacent parts/hinges 135 to be mated. While the male component 132 is direction independent, the female component 131 requires indexing. The two components 131/132 are aligned correctly, snap together and are held by friction.

Figure 14:
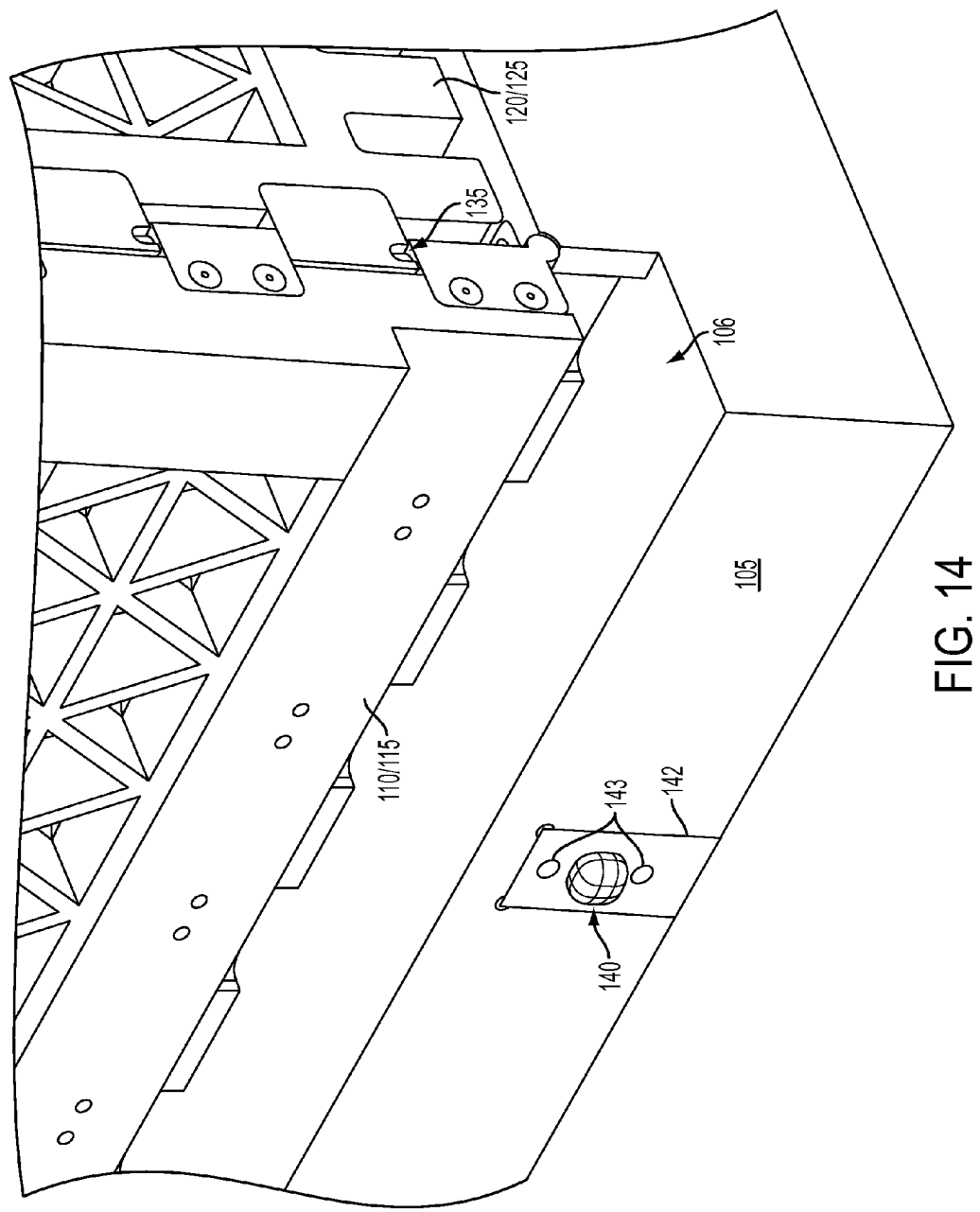
FIG. 14 is a partial close-up view of an exterior lower side/corner of the apparatus to illustrate a safety bumper in more detail.

FIG. 14 is a partial close-up view of an exterior lower side/corner of the apparatus to illustrate a safety bumper in more detail. As users likely will reconfigure the apparatus between modes on rough surfaces, it is desired to protect the sides (gates and leaves) from scratches and external damage caused by these surfaces. Accordingly, a plurality of safety bumpers 140 have been installed in spaced relation on vertical side surfaces of base 140. Each bumper 140 may be made of a hard thermoplastic such as ABS or a silica-based material and protrudes out so as to distribute the weight of the apparatus 1000 if placed on a side thereof. The bumper 140 is attached to a plate 142 that is secured to base 105 by suitable fasteners 143 such as rivets, screws, etc.

Figure 15:
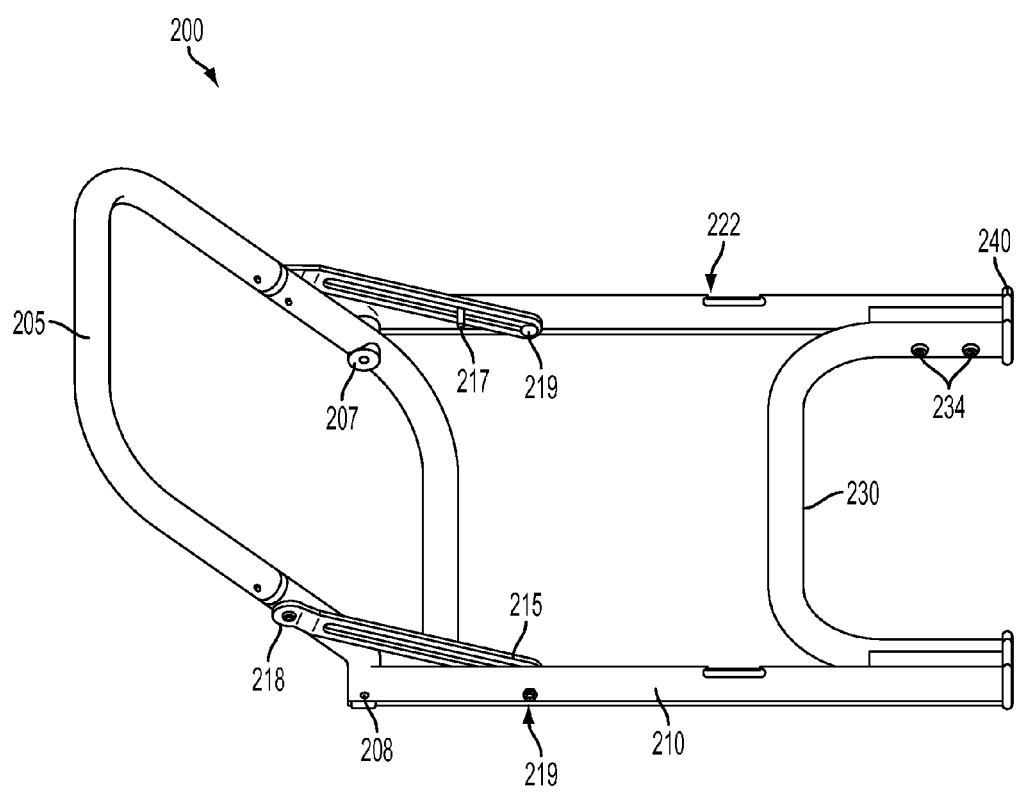
FIG. 15 is a top perspective view of the handle subassembly according to an example embodiment.
Figure 16:
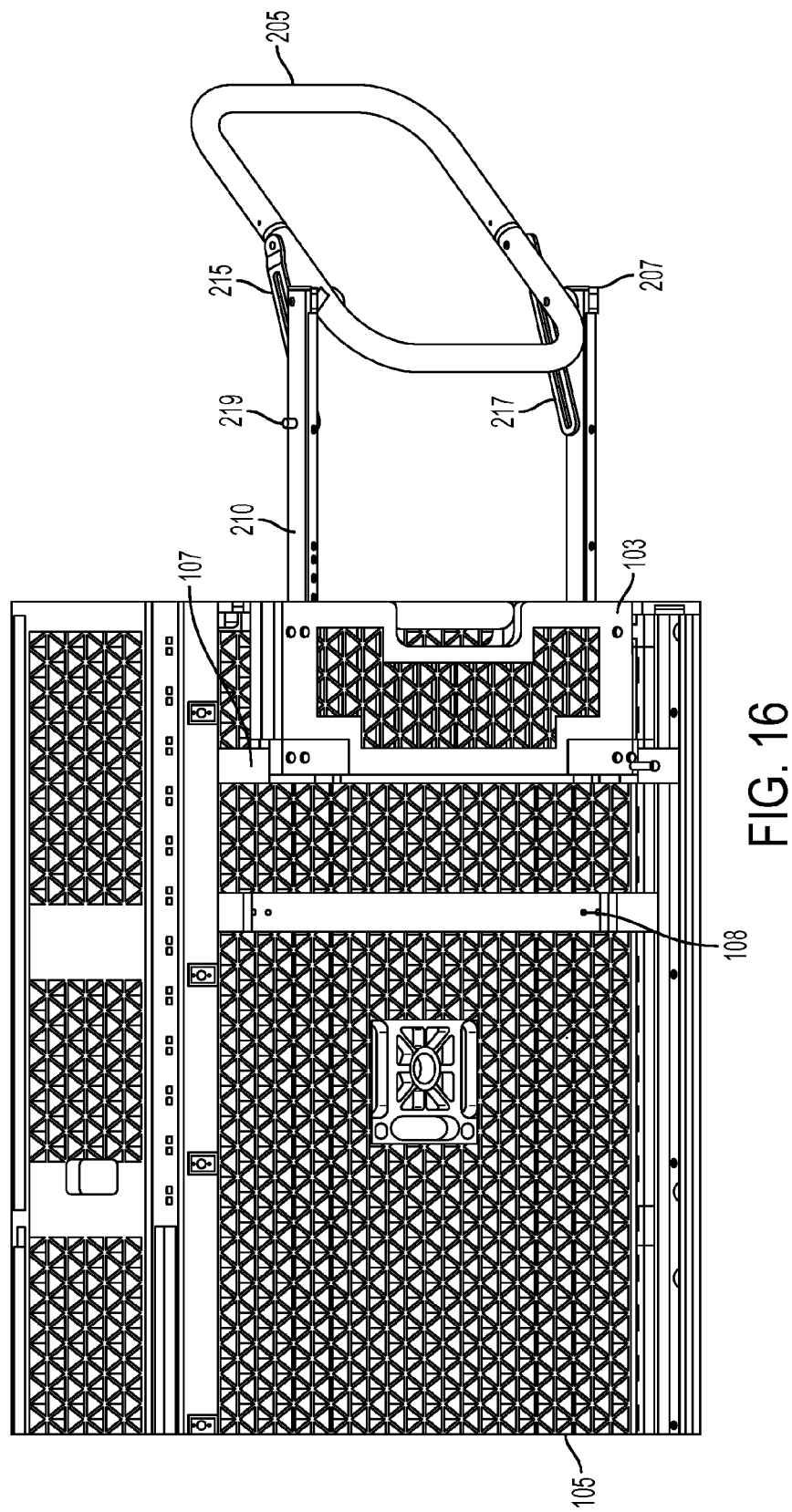
FIG. 16 is a bottom perspective view of part of the apparatus showing the cart/table subassembly with the handle subassembly in its extended position.
Figure 17:
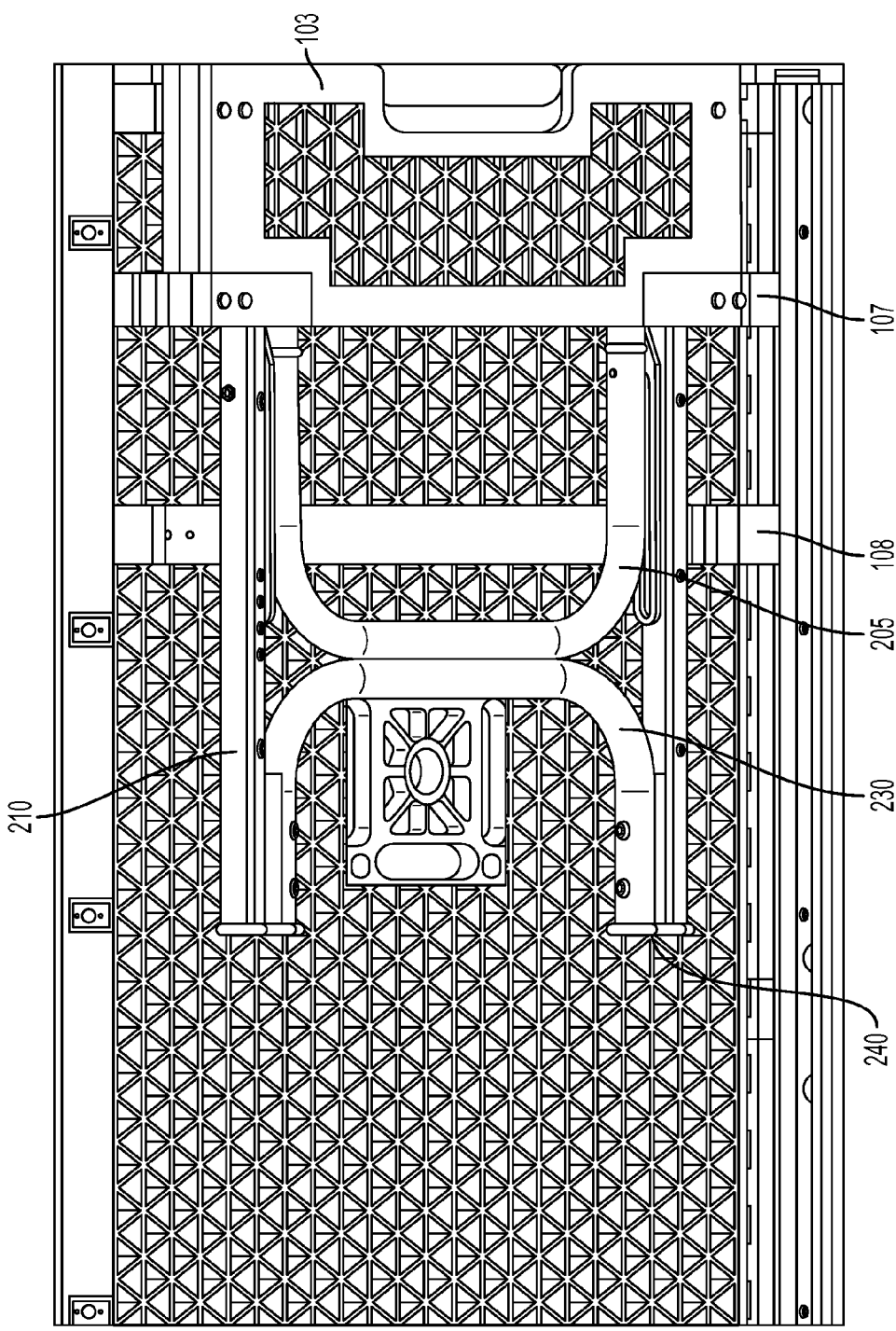
FIG. 17 is a bottom perspective view of part of the apparatus showing the cart/table subassembly with the handle subassembly in its retracted position.

FIGS. 15-17 are provided to describe the handle subassembly 200 in more detail; with FIG. 15 being a top perspective view of the handle subassembly, FIG. 16 a bottom perspective view of part of the apparatus showing the cart/table subassembly with the handle subassembly in its extended position, and FIG. 17 a bottom perspective view of part of the apparatus showing the cart/table subassembly with the handle subassembly in its retracted position.

Referring to FIGS. 15-17, the handle subassembly 200 includes a pivotable handle 205 that may pivot by way of a pair of latching pivot arms 215. Each pivot arm 215 is secured between the handle 205 at fixed pin 218 and may rotate via guide pin 219 within track slots 217. The axis of rotation is provided by cams 207, which are secured to slide arms via pins 208.

To maneuver the handle 205, the latching pivot arms 215 are pressed outward to allow inward rotational movement of the handle 205 and/or to insert/retract the handle subassembly 200 into the recess 235 of the boss block 103. In one configuration, when the slot recesses 222 are fully exposed, the lock buttons 220 (see FIG. 1) overcome spring pressure to pop up out of the slot recesses and provide a safety feature to prevent the slide arms 210 from inadvertent retraction into the boss block aperture 235 when in the cart/dolly modes, for example.

A support bar 230 provides rigidity to the subassembly 200 and is connected to the slide arms 210 by a plurality of fasteners 234. The ends of support bar and slide arms 210 terminate at stops 240.

FIG. 17 shows the fully retracted position of the handle subassembly 200, for stowage mode. The handle 205 has been folded in, with handle 205 and support bar in line and in plane beneath a pair of spaced support braces 107 and 108 that provide rigidity to the base 105 structure of the cart/table subassembly 100. In an alternative embodiment, support braces 107/108 can be molded parts of the "table surface" of base 105.

In another embodiment, a lever or a release button may be used in conjunction with movement arms attached to the cams to provide the pivoting movement of the handle 205 and to allow retraction into or withdrawal of the handle subassembly 200 from the boss block aperture 235. In another example, channel locks within the aperture 235 may be engaged or disengaged to secure or withdrawn the handle 205 therefrom. In a further example, the handle 205 may be a contiguous part of the leg subassembly 300, to retract out of the boss block aperture 235 as the leg subassembly 300 is raised, and to withdraw back through the boss block aperture as to leg subassembly 300 is collapsed to a stowage position up within an underside of base 105.

Figure 18:
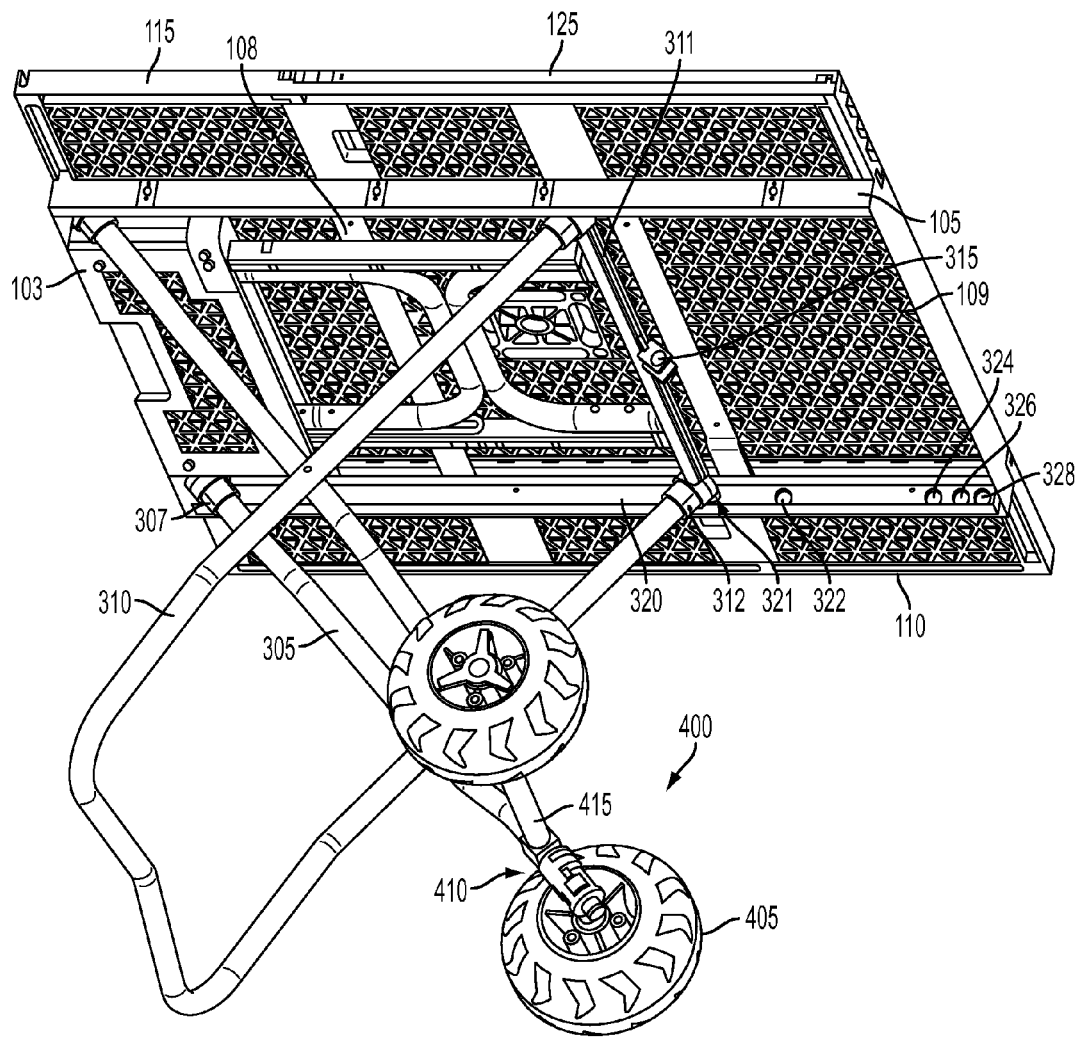
FIG. 18 is a bottom perspective view of the apparatus to illustrate the leg subassembly in more detail.
Figure 19:
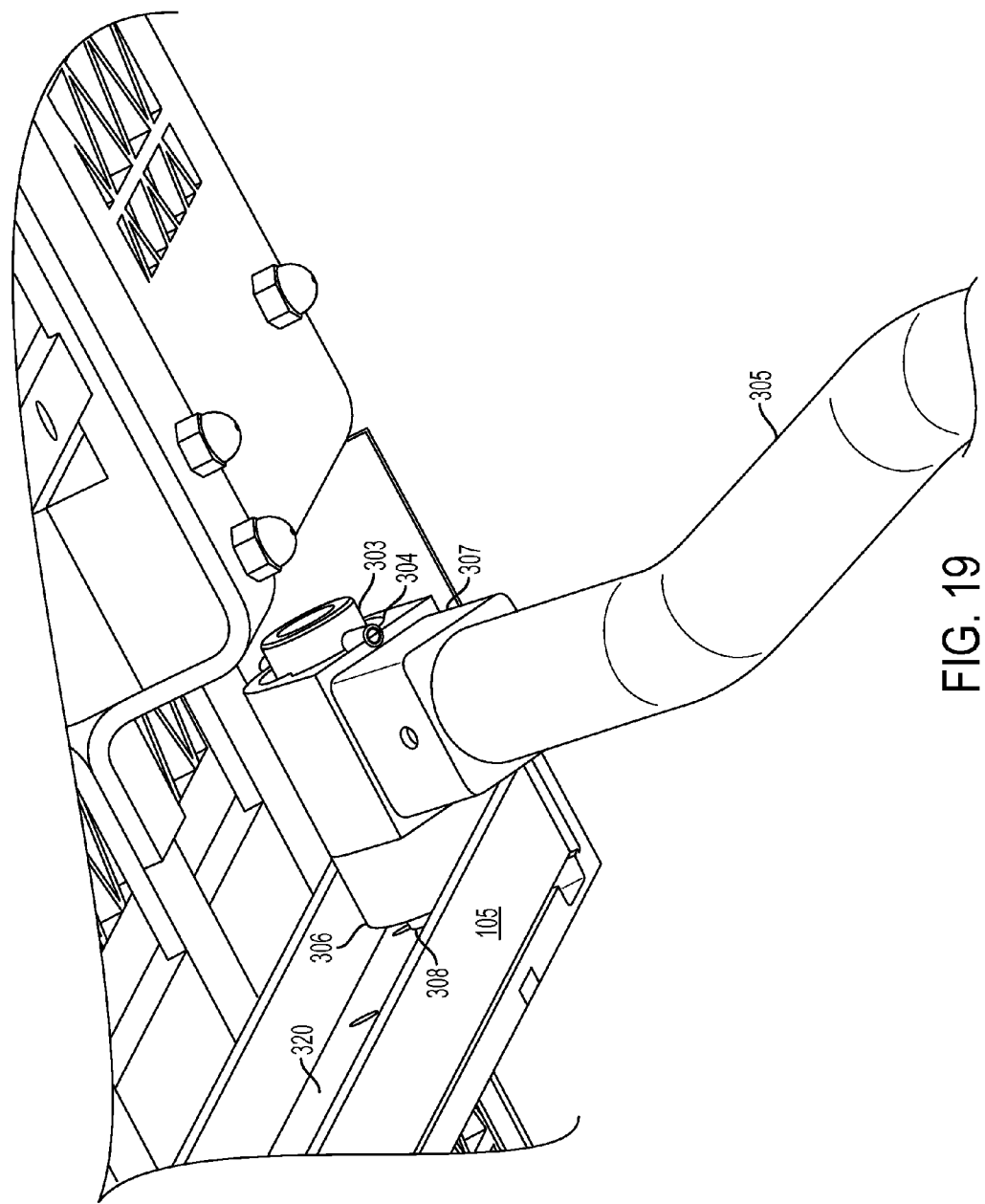
FIG. 19 is a partial close-up view of part of the leg subassembly to illustrate the wheel-connected legs to rails engagement in more detail.
Figure 20:
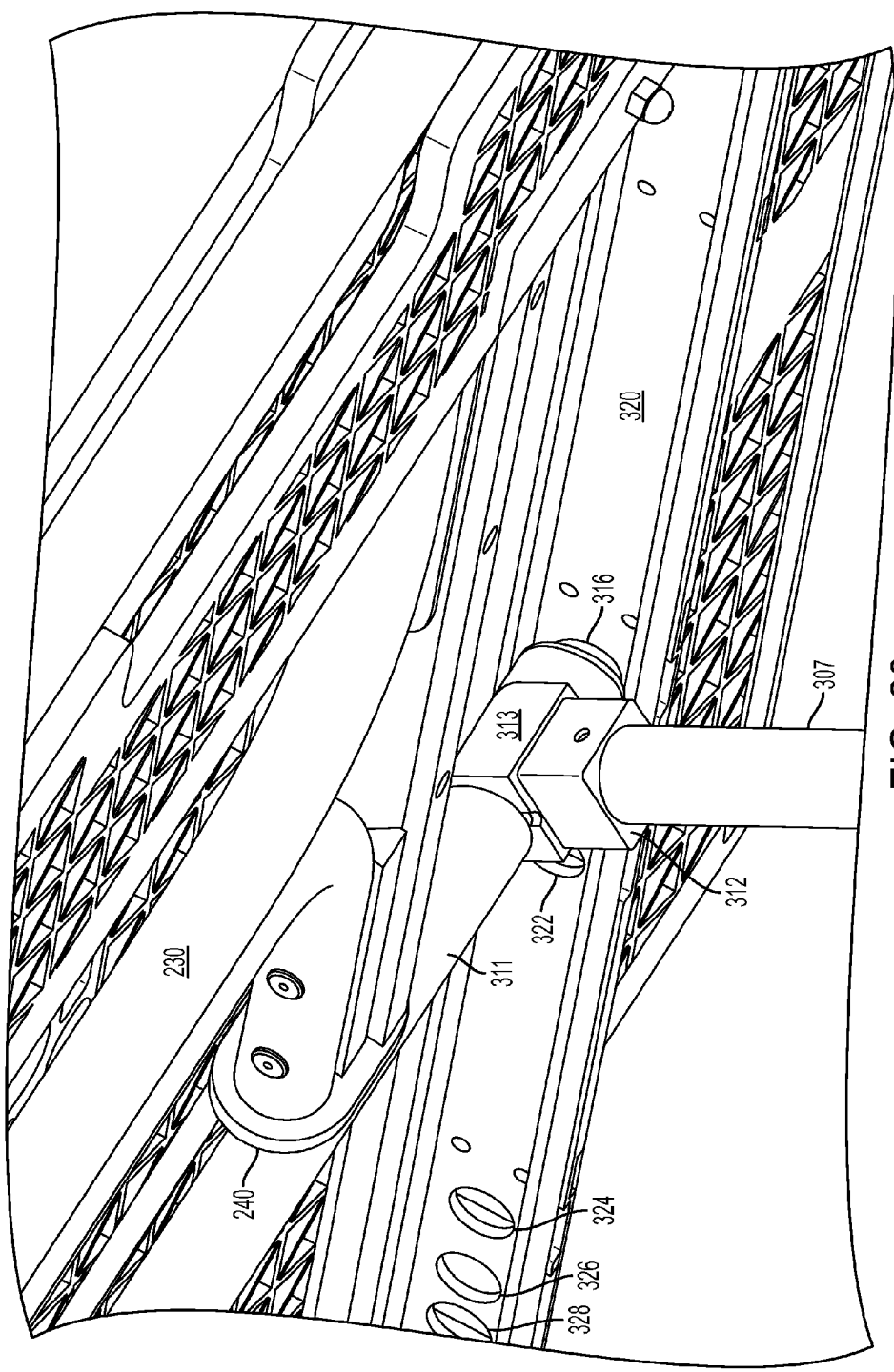
FIG. 20 is a partial close-up view of part of the leg subassembly to illustrate the non wheel-connected legs to rails engagement in more detail.
Figure 21:
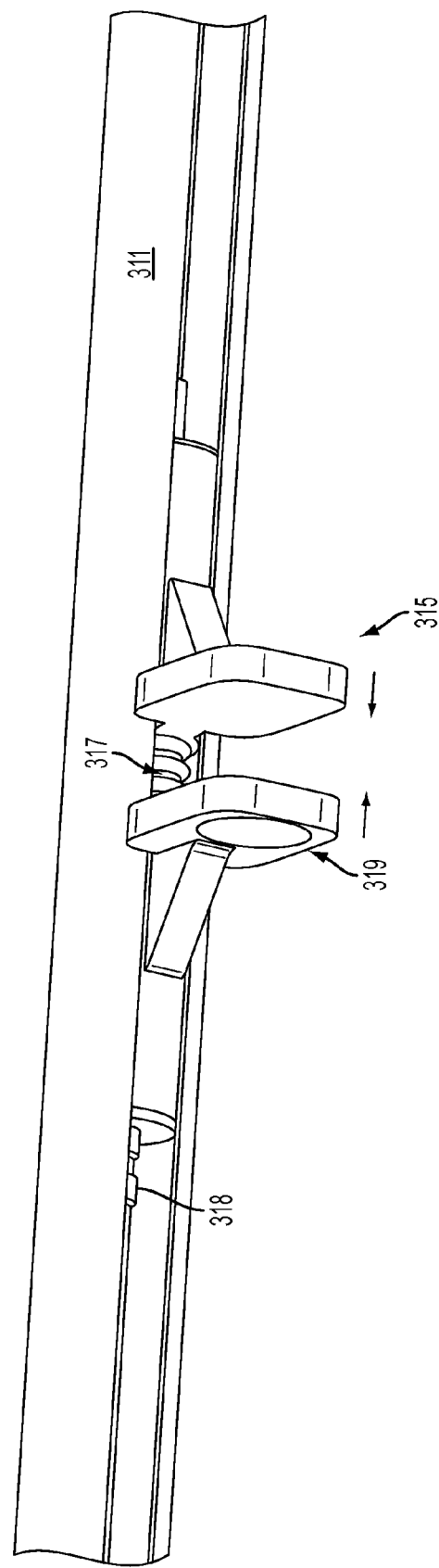
FIG. 21 is a partial close-up view of part of the leg subassembly to illustrate the height selector in more detail.

FIGS. 18-21 are provided to describe the leg subassembly 300 in more detail; with FIG. 18 being a bottom perspective view of the apparatus to illustrate the leg subassembly in more detail, FIG. 19 a partial close-up view of part of the leg subassembly to illustrate the wheel-connected legs to rails engagement, FIG. 20 a partial close-up view of part of the leg subassembly to illustrate the non wheel-connected legs to rails engagement, and FIG. 21 is a partial close-up view of part of the leg subassembly to illustrate the height selector.

Referring to FIG. 18, the leg subassembly 300 includes a pair of guide rails 320 attached along opposing inside side surfaces of the base 105. Each guide rail 320 has a plurality of leg detent positions 321, 322, 324, 326 and 328 formed therein which determine the height of the base 105 above ground. Table mode (30") is position 321, as shown. Table mode (27") is position 322. Cart mode (17") is position 324; with dolly mode 8" (position 326) and cross-leg support fully collapsed (position 328). As previously shown in FIG. 5, the thickness profile of the apparatus 1000 in stowage mode with the wheels removed is 6".

The leg subassembly 300 includes a cross-leg support formed by the wheel-connected legs 305 crisscrossed with the non-wheel connected support stanchion 310. Each upper end 307 of the wheel-connected legs 305 is hard connected into a corresponding end of the guide rails 320. Each upper end 312 of the non-wheel connected stanchion 307 is slidable in a corresponding guide rail between a selected one of the detent positions. The selector 315 on cross beam 311 may be configured as a pair of paddle shifters and enables movement of the upper ends of the non-wheel connected stanchion 307 within the guide rails 320 so as to adjust the apparatus 1000 in height (of base 105 above ground) when shifting shift between cart, table and dolly modes.

As shown in FIG. 19, the upper end 307 of a wheel-connected leg 305 terminates in a lug 306. The lug 306 has a pair of protruding spring-biased bosses 303, 308, one of which is locked into a recess formed in the guide rail 320, the other of which is secured by a retainer 304 so as to fix the position of the lug 306 and hence the leg 305 at the guide rail 320 terminal end.

As shown in FIG. 20, an upper end 312 of the non-wheel connected stanchion 307 terminates in a lug 313. The lug 313 has a protruding spring-biased boss 316 which is connected via a tension wire internal to cross beam 311 to a paddle shifter 319 of selector 315. Based on actuating selector 315, the boss 316 can be retracted to permit free movement of the upper end 312 within the guide rail 320 between leg detent positions. As best shown in FIG. 21, both paddle shifters 319 are actuated inward to compress spring 317, retracting the bosses 316 to permit movement of the upper ends 312, for example.

Figure 22:
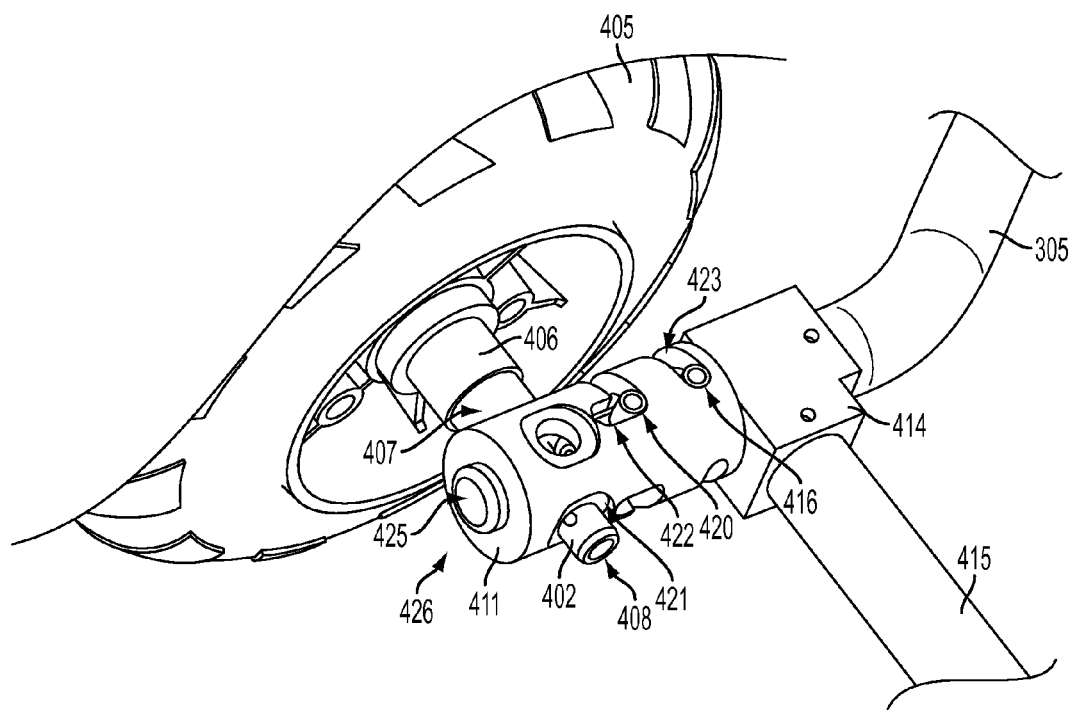
FIG. 22 is an enlarged perspective view to illustrate the rotation cuff assembly in more detail.

FIG. 22 is an enlarged perspective view to illustrate the rotation cuff assembly in more detail. The rotation cuff assembly 410 includes a rotation cuff 411 from which protrudes a release button composed of a body 412 (not shown) and actuator 425 which protrudes out the lower end 426 of the rotator cuff 411. A connector housing 414 encloses interior components and fits within rotation cuff 411. The connector housing 414 connects the rotation cuff 411 with the common axle 415 and a wheel-connected leg 305. The rotation cuff assembly 410 permits rotational movement of the wheel 405 back and forth between its stowed position (FIG. 4) over a 90 degree arc of rotation to the in-line or operational position shown in FIG. 22. As can be seen, the wheel axle 402 penetrating a cuff slot 421 in the rotation cuff 411, as it extends through a bearing sleeve 406 and pressure washer 407 to terminate out the other side of the rotation cuff, capped by a retaining ring 408. By depressing actuator 425, spring pressure holding pins 416 and 420 in slots 423 and 420 (to prevent rotational movement) is overcome to permit the rotation cuff 411 with the wheel on its axle 402 with bearing sleeve 406 and washer 407 to rotate. Releasing the actuator 425 engages the spring pressure to bias the pins 416/420 back into the slots 423/422 to hold the rotation cuff 411 in fixed position.

Accordingly, each rotation cuff assembly 410 includes a depressible actuator 425. Depressing the actuator 425 thus permits rotation of a releasable wheel 405 thereon from a position perpendicular to the axis of rotation of the apparatus 1000 (i.e., its stowage position as shown in FIG. 4) to a position in-line with the axis of rotation (i.e., as shown in FIGS. 1 and/or 22). Further, as will be seen in further detail hereafter, each wheel 405 includes a release button 403 permitting selective attachment to and removal from its corresponding rotation cuff 411.

Figure 23:
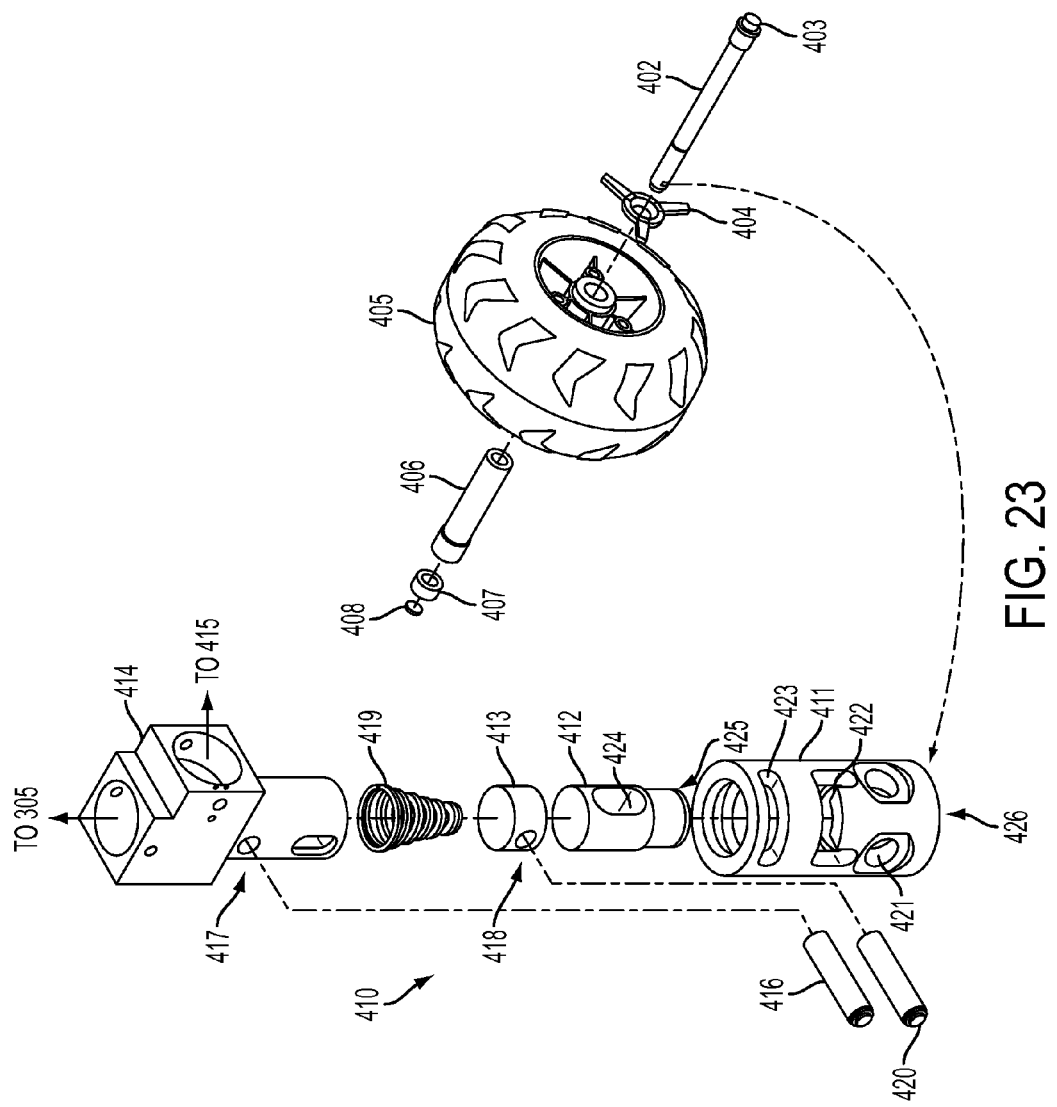
FIG. 23 is an exploded parts diagram of the wheel subassembly to illustrate the rotation cuff and wheel to rotation cuff engagement in more detail.

FIG. 23 is an exploded parts diagram of the wheel subassembly to further describe the rotation cuff assembly and wheel to rotation cuff engagement in more detail. The dotted line in FIG. 23 illustrates the relation of the wheel axle 402 to the cuff slot 421 in the rotation cuff 411. The wheel 405 is removable from the rotation cuff assembly 410 for separate stowage, to further reduce the profile of the apparatus 1000 in stowage mode, as shown earlier in FIG. 5. The wheel axle 402 has a pair of spaced detent buttons 409 that are triggered by depressing a release button 403 on the end of the wheel axle to remove the entire wheel 405 and constituent components from the cuff slot 421. Specifically, a user grasps handle grip 404 for balance and depresses release button 403. The detent buttons 409 recede within the interior of the wheel axle, allowing the wheel with axle 402, bearing sleeve 406, pressure washer 407 and retaining ring 408 as a contiguous unit to be detached from the cuff slot 421 of the rotation cuff 411.

The left side of FIG. 23 shows an exploded parts view of the rotation cuff assembly in more detail. The release button for the rotation cuff includes a body 412 with actuator 425, which extends through the bottom end 426 of the rotation cuff so that the actuator protrudes out the bottom, as shown in FIG. 22. The cuff slot 421 and slots 422 and 423 are clearly shown. A bearing 413 bears against button body 412 under spring 419 pressure and specifically holds pin 420 in slot 422 when actuator 425 is not engaged. Similarly, aperture 417 in connector housing 414 engages one end of pin 416, the other end residing in slot 423 and under spring 419 pressure. The spring 419 is overcome upon a user depressing actuator 425, which forces body 412 up against bearing 413, compresses spring 419 and withdraws the pins 416/420 out of the slots 422/423. This permits the aperture 424 in button body 412 to align and turn with the wheel axle 402 in the left/right 90 degree direction.

Alternative leg and wheel structures may include a standard folding table leg system, where the legs fold up to the base of the table/cart subsystems when stowed and fold down when in table mode. Additionally the wheels 405 could be configured to fold similar to the landing gear on an airplane, with a rigid strut and a brace similar to the brace on the table legs. The wheels may attach and/or detach through another quick release mechanism. Other additional features may include the use of three and four wheels rather than just two. Additionally the apparatus 1000 as configured may include caster wheels on the front legs 305 for use on hard surfaces when pulled by a bicycle or by hand over cement or asphalt.

In one example, the wheels 405 employed in the apparatus may be oversized wheels based on well known or off-the-shelf wheel structures such as the Wheeleez®, for example. The wheels 405 are deployable and stow able by way of a push-button release mechanism 403 and include quick release axles 402 which allow instant wheel 405 removability, so as to reduce the overall stowage footprint of the apparatus 1000.

Figure 24:
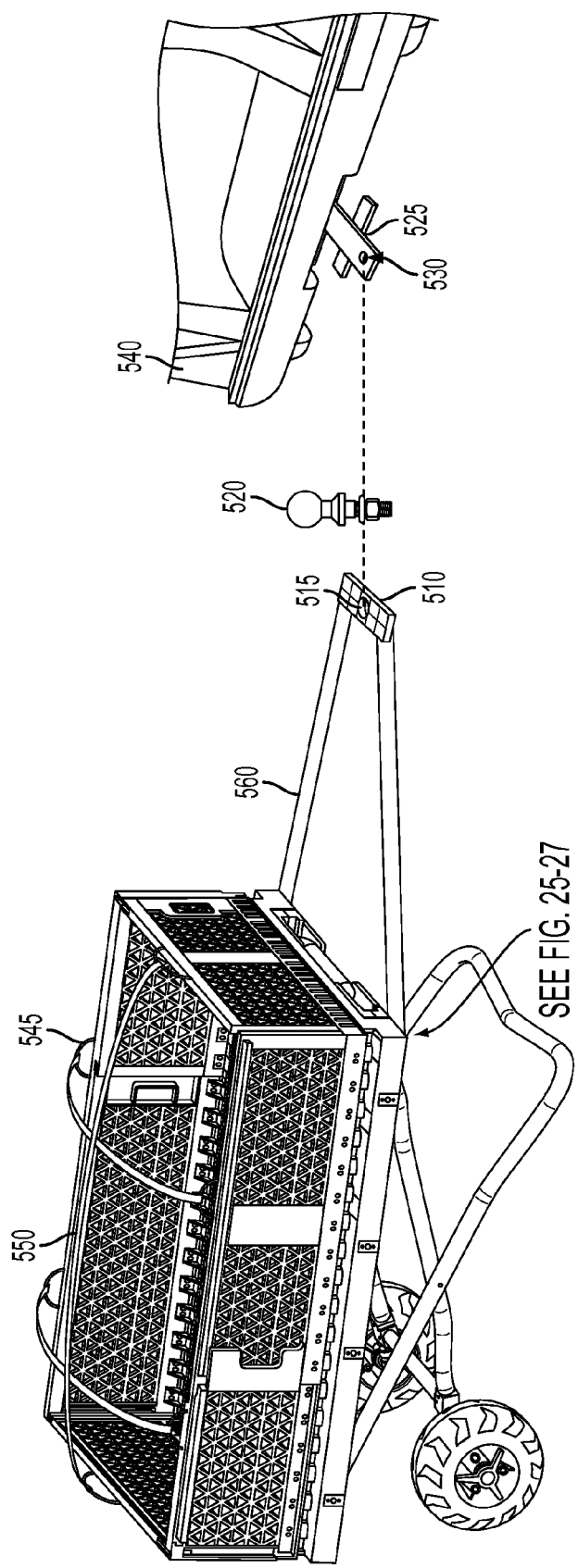
FIG. 24 is a perspective view of a wheeled apparatus in accordance with another embodiment.

FIG. 24 is a perspective view of a wheeled apparatus in accordance with another embodiment. In an example, the apparatus 1000 in cart mode may be configured for towing by various vehicles, such as bicycles, golf carts, all-terrain vehicles (ATVs), horses, etc., depending upon the situation. In another example, two or more apparatuses 1000 may configured for towing in tandem behind a golf cart, ATV or bicycle. Further, the apparatus 1000 in another configuration could be adapted with seat harnesses or safety/seatbelts to carry small children or passengers if desired. The example embodiments are not so limited to the aforementioned applications; others may include hunting, vendor and/or construction site applications, for example.

As shown in FIG. 24, in one example, the apparatus 1000 in a modified cart mode (with the handle 205 retracted) is configured so as to be towed by any of a golf cart, ATV or bicycle; here shown in conjunction with a golf cart 540. The base 105 can be removably fitted with a set of trailer tow arms 560 that may be connected at one end thereof to an underside of the base 105 and/or boss block 103. The other ends of trailer tow arms connect to a support plate 510 which includes an aperture 515 therein which aligns with a corresponding aperture 530 of a hitch receiver plate 525 affixed to the towing apparatus (here the golf cart 540). A suitable ball hitch 520 may secure the support plate 510 to the hitch receiver plate 525 as is known. Other hitch mechanism may be substituted for the standard ball hitch configuration shown in FIG. 23.

Additionally, the cart/table subassembly 100 may be configured with a plurality of connective points, such as D-rings 545, for securing a plurality of straps 550 thereon. These may be quick-disconnect accessory items, or may be fitted as part of the molded article. Accordingly, loose articles may be secured within.

Figure 25:
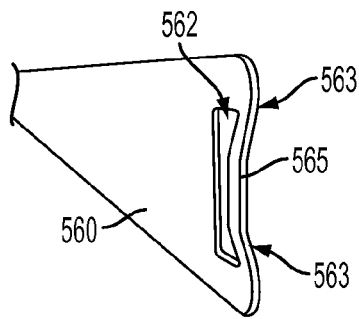
FIG. 25 is an end-on view of a portion of a trailer tow arm connection to the base to illustrate the latch member in more detail.
Figure 26:
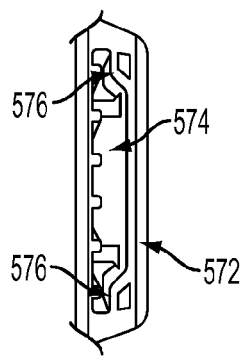
FIG. 26 is a front plan enlarged view of part of the trailer tow arm securing means to illustrate the slot and flexible tongue in further detail.
Figure 27:
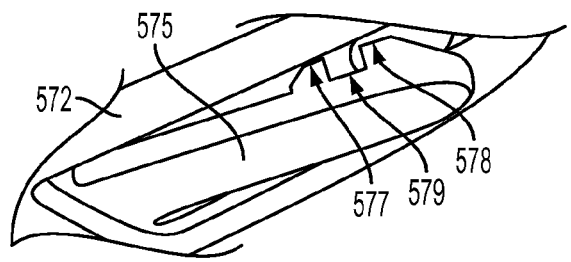
FIG. 27 is a partial top plan view of the trailer tow arm securing means to illustrate features of the flexible tongue in more detail.

FIGS. 25-27 illustrate one example attachment mechanism of the trailer tow arms 560 to the base 105 or boss block 103. It is envisioned that the tow arms should be easily installable and removable when a user desires to have the apparatus 1000 towed in the modified cart mode by a towing apparatus such as an ATV, golf cart, bicycle, etc. Various kinds of quick disconnect mechanisms may be employed. One example is directed to a tongue and latch arrangement as described hereafter.

FIG. 25 is an end-on view of a portion of a trailer tow arm connection to the base to illustrate the latch member in more detail; FIG. 26 is a front plan enlarged view of part of the trailer tow arm securing means to illustrate the slot and flexible tongue in further detail; and FIG. 27 is a partial top plan view of the trailer tow arm securing means to illustrate features of the flexible tongue in more detail. Referring to FIGS. 25-27, an end portion of a trailer tow arm 560 is provided to illustrate a latch member 565 which is designed to engage a flexible tongue 575 in a slot 574 of a retainer mechanism 572 that is affixed by weld, adhesive or fasteners to the underside of base 105 or boss block 103. The end of trailer tow arm 560 is configured with a latch member 565 that has a canted or angled profile (shown generally at angled portions 563) that is designed to be inserted into an alignment channel within slot 574 for engagement with an associated flexible tongue 575. The aperture 562 formed in the trailer tow arm 560 enables the latch member 565 to be fixedly captured within the tongue 575, as to be described in more detail hereafter.

The interference fit relationship between the latch member 565 and flexible tongue 575 is identical for each retainer 572 A following example describes one possible connective engagement of a trailer tow arm 560 into (or out of) a retainer 572.

Referring to FIGS. 26 and 27, each slot 574 of retainer 572 is dimensioned to receive an end of the trailer tow arm 560 with its mirror profile latch member 565 configuration. For example, angled ridges 576 act as alignment guides for the angled portions 563 of the latch member 565. The flexible tongue 575 can be seen within the opening of slot 574. As best seen in FIG. 27, the tongue 575 can be depressed by the user to enable the latch member 565 to travel over latch stop 577 so that the latch member 565 snap fits into recess 579 in the tongue 575. Second stop 578 acts to limit travel of the trailer tow arm 560, with the latch member 565 secured in the recess 579 and the latch stop 577 extending within the aperture 562 of the trailer tow arm 560.

In an example, the tongue 575 has sufficient give to enable the trailer tow arm 560 to be inserted into the slot 574 such that the latch member 565 overcomes the tension of the tongue 575 so as to engage the recess 579 in a snap fit engagement. To remove the trailer tow arm 560, the user simply depresses the tongue 575 to remove the stops 577/579 and recess 578 from the latch member 565, and then simply slides the trailer tow arm 560 out of slot 574.

Figure 28:
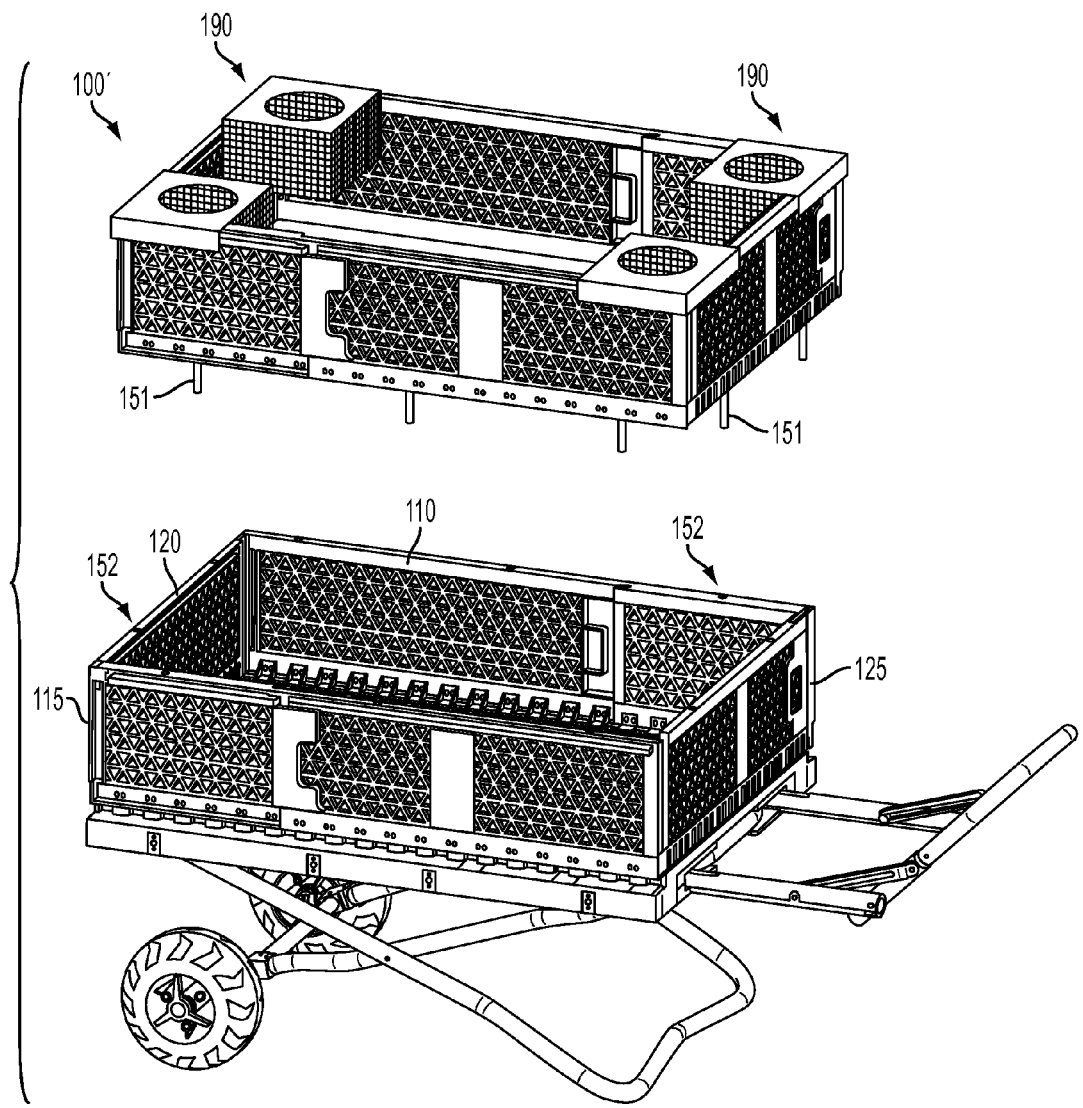
FIG. 28 is a perspective view of a wheeled apparatus in accordance with another embodiment.

FIG. 28 is a perspective view of a wheeled apparatus in accordance with another embodiment. In this example, each leaf 110/115 and gate 120/125 has been modified to include drilled apertures on a top side thereof. These are configured to receive fitted dowel structures 151 so as to connect a second row 100' or structure of walls to, at a minimum, double the height capacity of the apparatus 1000. This inclusion of the second row 100' may be a separately purchased accessory item or may be inclusive as part of the apparatus 1000. With this additional second row 100', the height may be at least doubled to 18 inches, increasing capacity to at least 9.75 ft$^3$.

Additionally, if the user desires to enjoy beverages to his/her final destination, removable cup holders 190 may be installed in the corners of the second row 100' or in corners of the junction between gate/leaf 120/115 and 125/110 of the cart/table subassembly 100, for example. These may be placed over the edges of the junction, and shaped so as to secure into the triangle shaped webbing of the sidewalls, for example.

Figure 29:
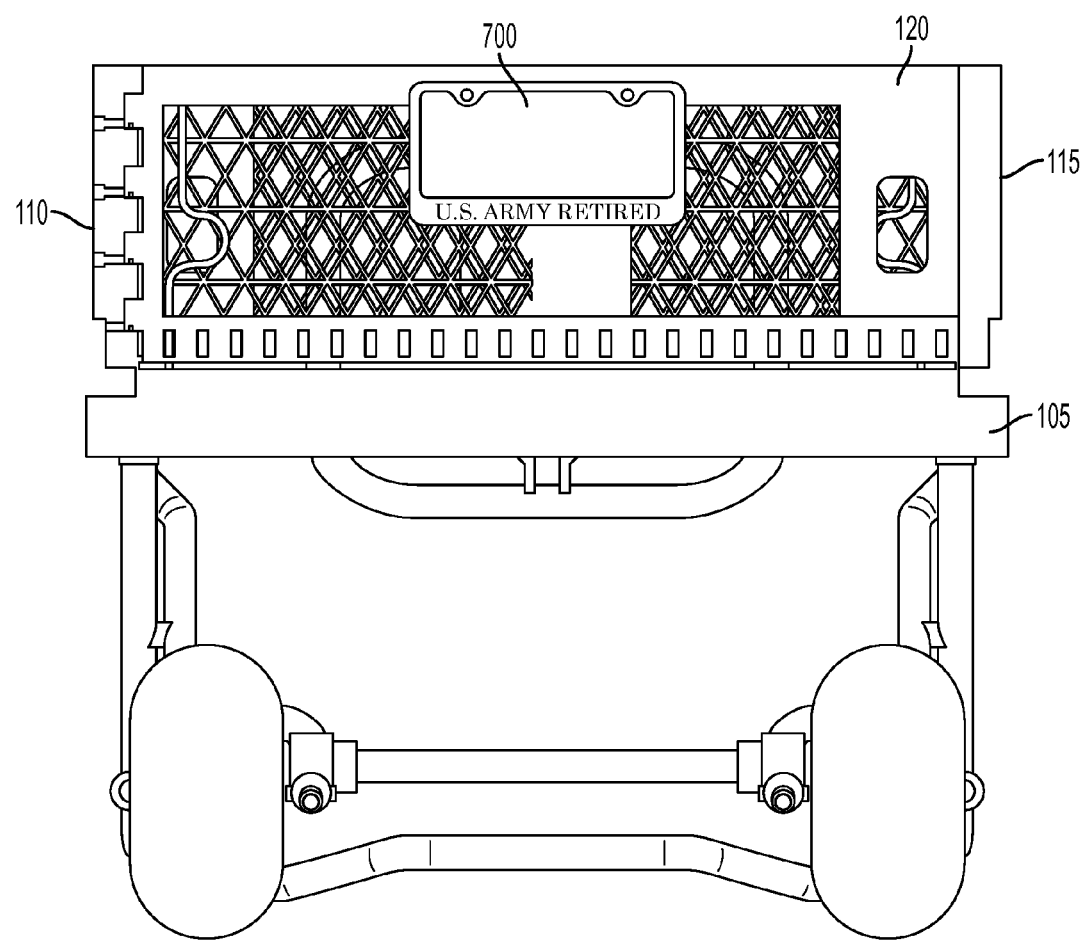
FIG. 29 is a rear view of the wheeled apparatus.

FIG. 29 is a rear view of the wheeled apparatus. In some instances, a user may desire to customize their apparatus 1000. Therefore, the rear gate 120 provides space for installing a license plate holder 700, as shown in FIG. 29. Alternatively, license plate holder can be installed on either leaf 110/115 and/or the front gate 125.

Figure 30A:
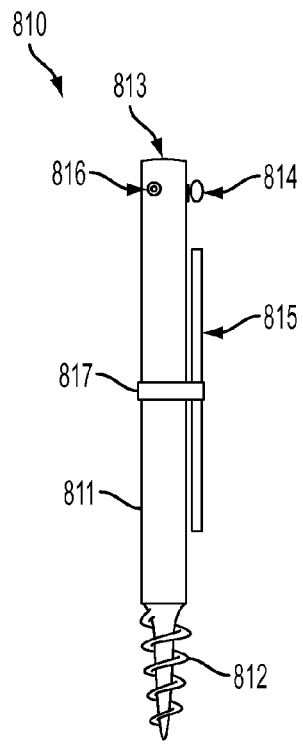
FIG. 30A illustrates an anchor for an umbrella for use in conjunction with the apparatus according to an example embodiment.
Figure 30B:
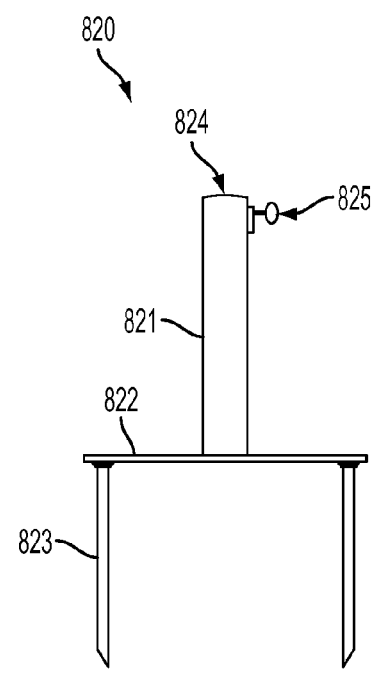
FIG. 30B illustrates an anchor for an umbrella for use in conjunction with the apparatus according to another example embodiment.
Figure 30C:
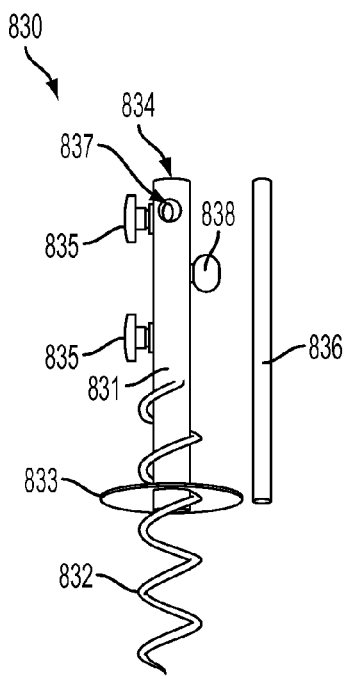
FIG. 30C illustrates an anchor for an umbrella for use in conjunction with the apparatus according to another example embodiment.

FIGS. 30A to 30C illustrate various anchors for umbrellas for use in conjunction with the apparatus according to the example embodiments. FIG. 7 previously illustrated a central aperture 146 designed to receive and secure an umbrella pole therein. In one example, the aperture is dimensioned to receive an umbrella pole having an outside diameter (OD) up to at least 1⅝", as most commercial umbrella poles for park and beach applications have an OD in the range of 1¼" to 1⅝". In another example, a variable width or telescoping locking mount may substitute for a fixed aperture 146 so as to be able to accommodate umbrella poles having variable ODs. In a further example, various anchors may be used in conjunction with aperture 146 to accommodate umbrella poles having different ODs. Each of the anchors shown in FIGS. 30A-30C can accommodate umbrella poles having an OD of up to 1⅝" or at least in a range of 1¼" to 1⅝". These anchors may be applicable to dirt and/or sand surfaces, for example. Each of the anchors 810, 820, 830 may be positioned under aperture 146 to receive an umbrella pole therein.

The anchor 810 of FIG. 30A has a hollow body 811 terminating in an anchor screw 812 and designed to receive an umbrella pole at 813. A drive handle 815 is inserted through hole 816 to facilitate inserting the anchor 810 into the sand/soil. Once secure, the pole is inserted and the set screw 814 is tightened to secure the pole in the body 811. The drive handle 815 may be secured by strapping 817 against the body 811.

The anchor 820 of FIG. 30B has a body 821 terminating at a foot plate 822 and a pair of spike 823. One pushes down on the foot plate 822 to drive the spikes 823 into the ground, then places the pole into the opening at 824, thereafter tightening the pole against the inside of body 821 via set screw 825.

The anchor 830 of FIG. 30C has a hollow body 831 terminating in an anchor coil 832 and designed to receive an umbrella pole at 834. A drive handle 836 is inserted through hole 837 to facilitate inserting the anchor coil 832 into the sand/soil to the stop plate 833. Once secure, the pole is inserted and a pair of set screws 835 is tightened to secure the pole in the body 831. The drive handle 836 may be secured by holder 838 against the body 831.

The example embodiments being thus described, it will be obvious that the same may be varied in many ways. Such variations are not to be regarded as departure from the example embodiments, and all such modifications as would be obvious to one skilled in the art are intended to be included herein.

I claim:

1. A multi-functional, collapsible wheeled apparatus, comprising:
 a generally rectangular base, the base having a longer dimension representing sides thereof and a shorter dimension representing a front and rear thereof, the base having an upper surface and a lower surface,
 a pair of leaves, each leaf pivotally connected along its lower end to a corresponding side of the base in opposite relation thereof by a plurality of horizontally arranged hinges located along the edge at the base upper surface,
 a pair of gates, each gate in facing relation to each other at the front and rear of the base, a side of a front gate pivotally connected to a front side of one of the leaves by a plurality of vertical hinges so that the front gate is configured to swing inward to its connected leaf and outward to be secured to the opposite leaf so as to form a front side when the apparatus is placed in a cart mode, a side of a rear gate pivotally connected to a rear side of the other leaf by a plurality of vertical hinges so that the rear gate is configured to swing inward to its connected leaf and outward to be secured to the opposite leaf so as to form a rear side when the apparatus is placed in the cart mode, a handle subassembly attached to the base, a leg subassembly attached to the base, and a single pair of wheels connected to the leg subassembly, wherein the apparatus is configurable in the cart mode, a table mode with the gates and leaves oriented in a flat horizontal plane, a dolly mode with the leaves and gates connected to form a cart but with the leg subassembly lowered closer to the ground relative to the cart mode, and a stowage mode where the leaves and gates collapse into the base, the handle subassembly retracts into the base and the leg subassembly collapses up into the lower surface of the base with the pair of wheels removed.

2. The apparatus of claim 1, wherein each leaf includes a recess enabling its corresponding gate to fold into the recess so that the outer facing surfaces of gate and leaf are flush, enabling a flat planar surface when pivoting the gate and leaf outward and downward for table mode or enabling the leaf and connected gate to be pivoted inward and downward on top of the base in preparation for stowage mode.

3. The apparatus of claim 1, wherein the base, leaves and gates have an isogrid structure of equilateral triangles to prevent toppling by wind and avoid collection of sand and debris.

4. The apparatus of claim 1, wherein each gate includes a gate latching pin which operates against spring pressure to lock into a corresponding pin recess in the base to secure the gate therein, in either an open position when configuring the apparatus for cart mode, or a closed position when configuring the apparatus for table or stowage modes.

5. The apparatus of claim 1, wherein the handle subassembly includes:

a handle, a pair of latching pivot arms which permit pivotable movement of the handle inward and outward for stowage and removal, and wherein the pivot arms are compressed outward to rotate the handle inward and to insert the handle subassembly into and beneath the base upper surface for stowage.

6. The apparatus of claim 1, wherein the leg subassembly includes:

a pair of guide rails, each attached along an inside side surface of the base, each guide rail including a plurality of leg detent positions which determine the height of the base for cart, table and dolly modes, a cross-leg support composed of a pair of wheel-connected legs crisscrossed with a non-wheel connected support stanchion, each upper end of the wheel-connected legs hard connected into a corresponding end of the guide rails, each upper end of the non-wheel connected stanchion slidable in a corresponding guide rail between selected detent positions, and a selector to adjust the apparatus in height by switching between the leg detent positions in the guide rails to shift between cart, table and dolly modes.

7. The apparatus of claim 6, wherein in table mode the selector is configured to adjust the height of the upper surface of the base to 27" or 30" above ground surface.

8. The apparatus of claim 6, wherein in dolly mode the selector is configured to adjust the height of the upper surface of the base to 8" above ground surface.

9. The apparatus of claim 6, wherein in cart mode the selector is configured to adjust the height of the upper surface of the base to 17" above ground surface.

10. The apparatus of claim 6, further comprising a wheel subassembly composed of a central axle interposed between respective lower ends of the wheel-connected legs, a pair of rotation cuffs attached to the bottom of the respective lower ends of the wheel-connected legs, each rotation cuff including a depressible button permitting rotation of a releasable wheel thereon from a position perpendicular to the axis of rotation of the apparatus to a position in line with the axis of rotation, each wheel including a release button permitting selective attachment to and removal from its corresponding rotation cuff.

11. The apparatus of claim 1, wherein in stowage mode with the pair of wheels removed, the apparatus has a thickness profile of 6.0".

12. A multi-functional, collapsible wheeled apparatus, comprising:

a generally rectangular base, the base having a longer dimension representing sides thereof and a shorter dimension representing a front and rear thereof, the base having an upper surface and a lower surface, a pair of leaves, each leaf pivotally connected along its lower end to a corresponding side of the base in opposite relation thereof, a pair of gates, each gate in facing relation to each other at the front and rear of the base, a side of a front gate pivotally connected to a front side of one of the leaves, a side of a rear gate pivotally connected to a rear side of the other leaf, a handle subassembly attached to the base, the handle subassembly composed of a handle, a pair of latching pivot arms which permit pivotable movement of the handle inward and outward for stowage and removal, wherein the pivot arms are compressed outward to rotate the handle inward and insert the handle subassembly into and beneath the base upper surface for stowage, a leg subassembly attached to the base, and a single pair of wheels connected to the leg subassembly, wherein the apparatus is configurable in the cart mode, a table mode with the gates and leaves oriented in a flat horizontal plane, a dolly mode with the leaves and gates connected to form a cart but with the leg subassembly lowered closer to the ground relative to the cart mode, and a stowage mode where the leaves and gates collapse into the base, the handle subassembly retracts into the base and the leg subassembly collapses up into the lower surface of the base with the pair of wheels removed.

13. The apparatus of claim 12, wherein the leg subassembly includes:

a pair of guide rails, each attached along an inside side surface of the base, each guide rail including a plurality of leg detent positions which determine the height of the base for cart, table and dolly modes, a cross-leg support composed of a pair of wheel-connected legs crisscrossed with a non-wheel connected support stanchion, each upper end of the wheel-connected legs hard connected into a corresponding end of the guide rails, each upper end of the non-wheel connected stanchion slidable in a corresponding guide rail between selected detent positions, and a selector to adjust the apparatus in height by switching between the leg detent positions in the guide rails to shift between cart, table and dolly modes.

14. The apparatus of claim 13, wherein in table mode the selector is configured to adjust the height of the upper surface of the base to 27" or 30" above ground surface.

15. The apparatus of claim 13, wherein in dolly mode the selector is configured to adjust the height of the upper surface of the base to 8" above ground surface.

16. The apparatus of claim 13, wherein in cart mode the selector is configured to adjust the height of the upper surface of the base to 17" above ground surface.

17. The apparatus of claim 13, further comprising a wheel subassembly composed of a central axle interposed between respective lower ends of the wheel-connected legs, a pair of rotation cuffs attached to the bottom of the respective lower ends of the wheel-connected legs, each rotation cuff including a depressible button permitting rotation of a releasable wheel thereon from a position perpendicular to the axis of rotation of the apparatus to a position in-line with the axis of rotation, each wheel including a release button permitting selective attachment to and removal from its corresponding rotation cuff.

18. The apparatus of claim 12, wherein in stowage mode with the pair of wheels removed, the apparatus has a thickness profile of 6.0".

19. A multi-functional, collapsible, wheeled apparatus, comprising:
- a generally rectangular base, the base having sides, front and rear thereof, an upper surface and a lower surface,
- a pair of leaves, each leaf pivotally connected along its lower end to a corresponding side of the base in opposite relation thereof,
- a pair of gates, each gate in facing relation to each other at the front and rear of the base, a side of a front gate pivotally connected to a front side of one of the leaves, a side of a rear gate pivotally connected to a rear side of the other leaf,
- a handle subassembly attached to the base,
- a dual cross-leg support connected to the lower surface of the base and expandable between vertically raised and lowered positions, and
- a wheel subassembly connected to the dual cross-leg support, the wheel subassembly composed of a central axle interposed between respective lower ends of one side of the dual cross-leg support, a pair of rotation cuffs attached to the bottom ends of the respective one side of the dual cross-leg support, each rotation cuff including a depressible button permitting rotation of a releasable wheel thereon from a position perpendicular to the axis of rotation of the apparatus to a position in-line with the axis of rotation, each wheel including a release button permitting selective attachment to and removal from its corresponding rotation cuff.

20. A multi-functional, collapsible, wheeled apparatus, comprising:
- a rectangular base having sides, a front, rear, upper surface and lower surface,
- a pair of leaves, each leaf pivotally connected along its lower end to a corresponding side of the base,
- a pair of gates, each gate forming a respective front and rear of the base, a side of a front gate pivotally connected to a front side of one of the leaves, a side of a rear gate pivotally connected to a rear side of the other leaf,
- a handle subassembly attached to the base,
- a leg subassembly connected to the base and expandable between vertically raised and lowered positions, and
- a wheel subassembly connected to the leg subassembly,
- wherein the apparatus is configurable in a cart mode, a table mode with the gates and leaves oriented in a flat horizontal plane, a dolly mode with the leaves and gates connected to form a cart but with the leg subassembly lowered closer to the ground relative to the cart mode, and a stowage mode where the leaves and gates collapse into the base, the handle subassembly retracts into the base and the leg subassembly collapses up into the lower surface of the base.

* * * * *